United States Patent [19]

Sugiyama et al.

[11] Patent Number: 4,914,908

[45] Date of Patent: Apr. 10, 1990

[54] ACTUATOR USED SHAPE MEMORY ALLOY AND DISPLAY CONVERSION DEVICE OF SIGNS

[75] Inventors: Masashi Sugiyama, Hiratsuka; Isamu Ohishi, Yokohama; Morio Handa; Junichi Ulyama, both of Hiratsuka, all of Japan

[73] Assignee: The Furukawa Electric Co., Ltd., Tokyo, Japan

[21] Appl. No.: 302,203

[22] Filed: Jan. 27, 1989

[30] Foreign Application Priority Data

Jan. 30, 1988 [JP] Japan ................................ 63-19761
Feb. 3, 1988 [JP] Japan ................................ 63-23609

[51] Int. Cl.[4] ................................ F03G 7/06
[52] U.S. Cl. ................................ 60/527
[58] Field of Search .................. 337/140; 60/527, 528, 60/529

[56] References Cited

U.S. PATENT DOCUMENTS 3,652,969 3/1972 Willson et al. ...................... 337/140
4,772,807 9/1988 Bouvat ............................ 60/527 X

*Primary Examiner*—Allen M. Ostrager
*Attorney, Agent, or Firm*—Oblon, Spivak, McClelland, Maier & Neustadt

[57] ABSTRACT

An actuator used shape memory alloy and a display conversion device of signs characterized in that, in the actuator equipped with a shape memory alloy allowing a movable body to work in one direction by the restoration force to the memorized shape at the time of temperature rising, a control base standing opposite to at least part of said movable body is provided, concave portions are provided to one of said movable body and control base and, at the same time, a control element is provided to the other thereof to guide said control element to said concave portion and to press said concave portion and control element against one another by a fixed resilience.

22 Claims, 21 Drawing Sheets

ACTUATOR USED SHAPE MEMORY ALLOY AND DISPLAY CONVERSION DEVICE OF SIGNS

BACKGROUND OF THE INVENTION

The present invention relates to an one-directional or two-directional actuator used a shape memory alloy and a display conversion device of signs used this actuator.

One directional actuators of this type are constituted to allow a movable body workable in one direction to work by the restoration force to the memorized shape of shape memory alloy at the time of temperatuer rising and are proposed to use, for example, for the automatic opening of flue gas duct at the time of fire etc.

Moreover, two-directional actuators used the shape memory alloy are constituted from a movable body provided so as to work in two directions with in a fixed range, a shape memory alloy provided so as to allow said movable body to work in one direction by the restoration force to the memorized shape at the time of temperature rising and a bias spring or a weight allowing said movable body to work in other direction by exerting the bias force at the time of temperature lowering when said shape memory alloy becomes soft, and are used for the automatic opening and shutting of ventilating window etc., top and bottom switching of air conditioner serving for both cooling and heating and of louver, and the like.

Said movable body is allowed to work in the direction of restoration thereof from a point of time when the restoration force of the shape memory alloy becomes more than the bias force due to the spring or the weight between a time when the temperature at a position of the installation of actuator reaches a temperature at which the shape memory alloy beings to be transformed to the austenite phase (hereinafter referred to as "As point") and a time until it rises to a temperature at which the transformation to the austenite phase completes (hereinafter referred to as "Af point"), and it is allowed to work in the acting direction of the bias force from a point of time when said bias force becomes more than the force of the shape memory alloy between a time when the temperature at said position of the installation is lowered to a temperature at which the shape memory alloy begins to be transformed to the martensite phase (hereinafter referred to as "Ms point") and a time until it falls to a temperature at which the transformation to the martensite phase completes (hereinafter referred to as "Mf point").

The shape memory alloy repeats the transformation to the austenite phase and that to the martensite phase according to the change in temperature and allows various ones as described above to be driven by the restoration force when transformed to the austenite phase. In the case of rapid change in temperature, the transformation progresses rapidly, but, in the case of slow change in temperature such as the change in air temperature for example, the transformation progresses gradually.

And, in the cases of flue gas duct etc., it is desirable for them to be opened at a stroke when rising to a fixed temperature. With the conventional one-directional actuators, however, the working is slow so long as the temperature rising is not steep. Thus, when using them, for example, for the opening of flue gas duct etc., it is sometimes impossible to open the duct at a stroke.

Moreover, when applying the actuator used the shape memory alloy to the driving for the display conversion device of road signs as proposed previously by the inventors (Japanese Utility Model Application No. Sho 62-120,196), for example, when converting from a display of "Run with Care" to "Beware of Freezing" at a temperature lower than a certain temperature and converting this to the display of "Run with Care" at a temperature higher than a certain temperature, conventional two-directional actuators work only slowly according to the change in air temperature. As a result, the display cannot be converted at a stroke and no accurate display is made on the way of conversion causing a problem of half-finished display.

The purpose of the invention is to improve such a drawback of the actuator used the shape memory alloy and to provide an one-directional or two-directional actuator being made to work rapidly at a predetermined temperature even when the change in temperature is slow.

Moreover, the shape memory alloys have a common characteristic that there are gaps of temperature between As point and Mf point and between Af point and Ms point (this is said as "temperature hysteresis") as exemplified, for example, in FIG. 32.

Since no measures are taken to said temperature hysteresis with conventional actuators of this type, there has been a drawback that the temperature to allow the movable body to work in one direction is different from that to allow it to return in other direction due to that the temperature at which the restoration force and the bias force are balanced in the process of the shape memory alloy being transformed to the austenite phase and the temperature at which the force of alloy becoming weak in the process being transformed to the martensite phase and the bias force are balanced are different from each other.

That is to say, in the example of FIG. 32, if the temperature at which the force generated on the shape memory alloy at the time of temperature rising and the bias force are balanced is Tw, the temperature at which the decreasing force of said shape memory alloy at the time of temperature lowering and the bias force are balance will become T.

In addition, from the same reason, the temperature to allow the movable body to work in one direction and that to allow it to return in other direction cannot be adjusted arbitrarily.

The invention has also a purpose to mechanically solve the problem due to the temperature hysteresis aforementioned and to provide an actuator of improved type with which the working temperature of movable body to both directions can be adjusted arbitrarily and easily within a range after the force of the shape memory alloy and the bias force have been balanced.

SUMMARY OF THE INVENTION

An actuator used shape memory alloy and a display conversion device of signs characterized in that, in the actuator equipped with a shape memory alloy allowing a movable body to work in one direction by the restoration force to the memorized shape at the time of temperature rising, a control base standing opposite to at least part of said movable body is provided, concave portions are provided to one of said movable body and control base and, at the same time, a control element is provided to the other thereof to guide said control element to said concave portion and to press said concave portion and control element against one another by a fixed resilience are disclosed.

Figure 32:
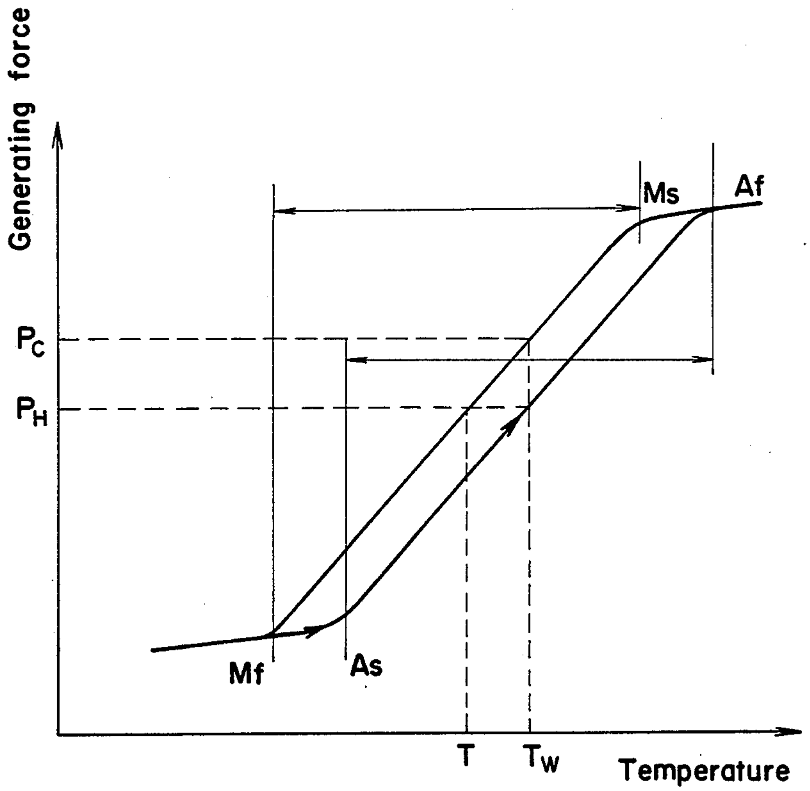

And, FIG. 32 is a chart showing an example fo relationship between temperature and force when the shape memory alloys are transformed.

Illustration of main marks in the drawings:

Reference numeral 1 is a movable body. Numerals 12 and 13 are concave portions. Numerals 14 and 15 are stoppers. Numeral 16 is a case. Numeral 17 is a slide piece. Numerals 2, 21, 22, 23 and 25 are axes. Numeral 3 is a rope wheel. Numeral 4 is a shape memory alloy. Numeral 5 is a bias spring. Numerals 41 and 51 are wire ropes. Numeral 5*a* is a weight. Numeral 6 is a control base. Numeral 60 is a control element. Numeral 61 is a case. Numeral 62 is a slide piece. Numeral 63 is a spring. Numeral 64 is a screw. Numeral 66 is an accommodating section. Numeral 67 is a hole. Numeral 70 is a side frame. Numeral 71 is a baseplate. Numeral 72 is a ceiling plate. Numeral 8 is a displaying body. Numerals 8*a*, 8*b* and 8*c* are display planes. Numeral 8*d* and 8*e* are coupled displays. Numeral 8' is a rotatable display disc. Numeral 83 is a case. Numeral 85 is a sign board. Numeral 86 is a display window. Numerals 101, 111 and 112 are movable bodies. Numeral 110 is a supporting frame. Numerals 113 and 114 are concave portions. Numerals 101*b* and 101*c* are stoppers. Numerals 102, 121, 122 and 123 are axes. Numeral 124 is a gear wheel. Numeral 103 is a rope wheel. Numerals 104 and 105 are spring cases. Numerals 141, 151 and 145 are control elements. Numerals 142 and 152 are springs. Numerals 143 and 153 are holders. Numerals 144 and 154 are adjusting screws for springs. Numeral 106 is a shape memory alloy. Numeral 107 is a bias spring. Numeral 108 is a displaying body. Numerals 108*a* and 108*b* are display board. And, numerals 109 and 109*a* are control bases.

DETAILED DESCRIPTION OF THE INVENTION

In the one-directional actuator in accordance with the invention, a control base is provided in opposition to at least part of a movable body, concave portions are provided to one of said movable body and control base and, at the same time, a control element is provided to the other thereof so that said control element is guided to siad concave portion and said concave portion and control element are pressed against one another by a fixed resilience for the accomplishment of said purpose.

Furthermore, in the two-directional actuator in accordance with the invention a control base in opposition to at least part of a movable body is provided, concave portions are provided to one of said movable body and said control base separating them at an interval corresponding to a working range of said movable body and, at the same time a control element to be guided to said concave portion by the working of said movable body is provided to the other thereof so that said concave portion and control element are pressed against one another by a fixed resilience in a state of said control element being guided to one of said concave portions for the accomplishment of said purpose.

In either case aforementioned, the movable body is constituted so as to rotate around an axis or to work linearly depending on the use of actuator.

The restoration force of said shape memory alloy and the bias force of the spring, weight or the like may be directly transmitted to the movable body or indirectly transmitted by a suitable transmission mechanism in structure.

To said shape memory alloys, what sort of shape memory alloys such as Ni-Ti type alloy, Cu-Zn-Al type alloy, Cu-Al-Ni type alloy, Fe type alloy, etc. can be applied.

Moreover, the shape of shape memory alloys is generally coil spring-shaped, but other shapes, for example, plate spring-shaped can also be used without being limited to this shape.

The control element to be guided to the concave portion causes the friction with the movable body when providing it on the side of control base and causes the friction with the control base when providing it on the side of movable body. Thus, it is desirable to constitute by using a roller of ball in order to make the frictional resistance as small as possible.

Moreover, it is desirable to constitute in a way that the resilience of spring etc. to press the control element and the concave portion against one another is adjustable with an adjusting screw etc.

Furthermore, in order to accomplish said purposes, the actuators have been made to have improved structures as below in the invention.

First, a plurality of movable bodies regulated so as to work in two directions within a fixed range, a shape memory alloy to allow said each movable body to work in one direction by the restoration force to the memorized shape at the time of high temperature and a bias spring or a weight to allow said each movable body to work in other direction at the time of low temperature are provided and a control element pressed by a spring inserted into a spring case in a state of the resilience being adjustable with an adjusting screw is allowed to contact under pressure with said each movable body. In part of said movable bodies, a concave portion is formed, to which the control element in contact with said movable body when said movable body works in one direction is guided and, at the same time, in other movable bodies, a concave portion is formed, to which the control element in contact with said movable body when said movable body works in other direction is guided.

Secondly, a movable body regulated so as to work in two directions within a fixed range, a shape memory alloy to allow said movable body to work in one direction by the restoration force to the memorized shape at the time of high temperature and a bias spring or a weight to allow said movable body to work in other direction at the time of low temperature are provided and a plurality of control elements pressed by springs each inserted into a spring case in a state of the resilience being adjustable with adjusting screws are allowed to contact under pressure with said movable body. In said movable body, a concave portion is formed, to which part of said control elements is guided when said movable body works in one direction and, at the same time, a concave portion is formed, to which other control elements are guided when working in other direction.

Thirdly, a plurality of movable bodies regulated so as to work in two directions within a fixed range, a shape memory alloy to allow said each movable body to work in one direction by the restoration force to the memorized shape at the time of high temperature and a bias spring or a weight to allow said each movable body to work in other direction at the time of low temperature are provided, a control base standing opposite to said each movable body is provided, a spring case inserted a spring, the resilience thereof being adjustable with an adjusting screw, is provided to said each movable body and, at the same time, each control element pressed by said spring is allowed to contact under pressure with said control base. In said control base, a concave portion is formed, to which part of said control elements is guided when said movable body works in one direction and, at the same time, a concave portion is formed, to which other control elements are guided when said each movable body works in other direction.

In this constitution, the control bases may be provided each separately corresponding to each movable body, or one control base corresponding to each movable body may be provided.

Fourthly, a movable body regulated so as to work in two directions within a fixed range, a shape memory alloy to allow said movable body to work in one direction by the restoration force to the memorized shape at the time of high temperature and a bias spring or a weight to allow said movable body to work in other direction at the time of low temperature are provided, a control base standing opposite to said movable body is provided, a plurality of spring cases each inserted a spring, the resilience thereof being adjustable with an adjusting screw, are provided to said movable body and, at the same time, each control element pressed by said each spring is allowed to contact under pressure with said control base. In said control base, a concave portion is formed, to which part of said control elements is guided when said movable body works in one direction and, at the same time, a concave portion is formed, to which other control elements are guided when working in other direction.

Fifthly, a movable body in a state of being workable linearly in both directions within a fixed range, a shape memory alloy to allow said movable body to work in one direction by the restoration force to the memorized shape at the time of high temperature and a bias spring or a weight to allow said movable body to work in other direction at the time of low temperature are provided, a control element is attached to said movable body, and a control base being possible to progress or retreat to the direction of said control element within a fixed range is provided facing to the working range of said control element. To said control base, a concave portion, to which said control element is guided when said movable body works in one direction, and a concave portion, to which said control element is guided when said movable body works in other direction, are provided, and said control base is pressurized in the position of said each concave portion by a spring inserted into each spring case in a state of the resilience being adjustable with each adjusting screw to contact said control base with said control element.

Moreover, in the signs having such a structure that, by providing a displaying body attached with two different displays to the surface and by allowing said displaying body to work with driving device in two directions within a fixed range according to a predetermined change in temperature, one of two displays in said displaying body is shown selectively, each actuator as described above has been used for the driving device to constitute, display conversion devices for the purpose of keeping the working temperature of said displaying body in both directions constant and adjusting arbitrarily it within a fixed range.

As previously mentioned, in order to decrease the friction between the control element and the movable body or the control base and to help the control element escape at a troke from said concave portion, to which it is guided, at the time of rising or falling to a predetermined temperature, it is preferable to use a roller or ball freely to roll for the control element.

When using roller for the control element, a slidable holder is provided at the tip of spring, to which the roller is held.

When using boll for the control element, this may be held at the tip of spring or may be held by a slidable holder provide at the tip of spring.

In the one-directional actuator constituted as above, the control element is pressed against the concave portion by a fixed resilience. Hence, when the shape memory alloy begins to be transformed to the austenite phase due to the gradual rising in temperature, it does not work until the restoration force thereof increases gradually and becomes stronger than the resilience pressing the control element and the concave portion against one another, if excluding the weight etc. of components worked by said actuator, and the restoration force of shape memory alloy is accumulated. At a point of time when the restoration force becomes stronger than said resilience, therefore, said control element escapes from said concave portion to work at a stroke.

Thus, the flue gas duct etc. can be worked rapidly.

Moreover, even in the two-directional actuator constituted as above, when the shape memory alloy begins to be transformed to the austenite phase due to the gradual rising in temperature, the restoration force of shape memory alloy is accumlated until reaching a fixed temperature. Hence, after reached said fixed temperature, the control element escapes from said concave portion to work at a stroke.

On the other hand, even when said shape memory alloy begins to be transformed to the martensite phase due to the gradual lowering in temperature and the bias force becomes stronger than the force of alloy, this does not work immediately to the reverse direction and is accumulated until exceeding the resilience, by which the bias force presses the control element and the concave portion against one another, after the bias force and the force of alloy have been balanced. At a point of time when the bias force is more than said resilience due to the further lowering in temperature, the control element escapes from said concave portion to work at a stroke.

When applying this to the driving for the display conversion of signs, therefore, the display can be converted rapidly even if the change in temperature is slow.

Moreover, since the improved type actuator in accordance with the invention is constituted as described above, when the movable body works in one direction and when it works in other direction, the work of movable body is suppressed each separately by the control elements being guided to the concave portion of the movable body or the control base and pressurized with different springs, respectively, and the resilience of the springs pressurizing each control element against the movable body or the control base is adjusted with adjusting screws. Thereby, within a range from the temperature at which the force of shape memory alloy and the bias force are balanced to Af point and within a range from the temperature at which the force of shape memory alloy and the bias force are balanced to the Mf point, the working temperature of the movable body can be adjusted arbitrarily and easily.

Furthermore, since the control elements to suppress the work of movable body each separately in both directions are guided to each separate concave poriton formed in the movable body or the control base, the restoration force of shape memory alloy at the time of high temperature and the bias force at the time of low temperature are accumulated in this position. As a result, the control element escapes from said concave portion at the time of having become the predetermined temperature to work the movable body at a stroke.

EXAMPLE 1

Figure 1:
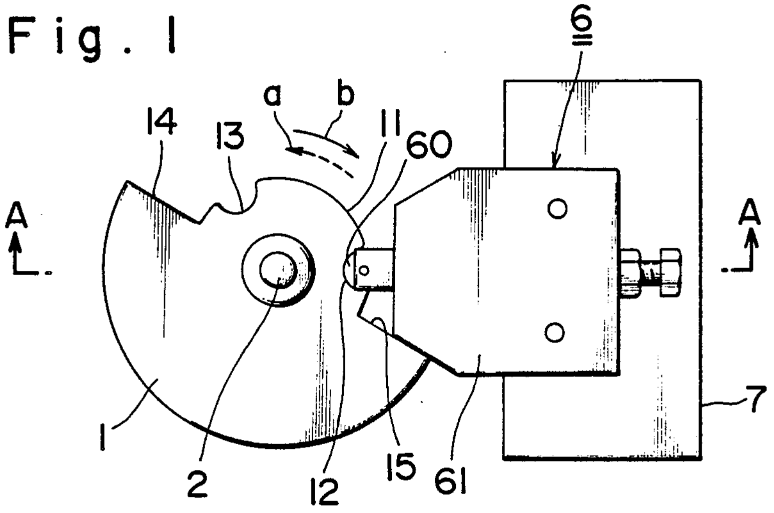
FIG. 1 is a plan view of necessary portion showing one example of actuators in accordance with the invention.
Figure 2:
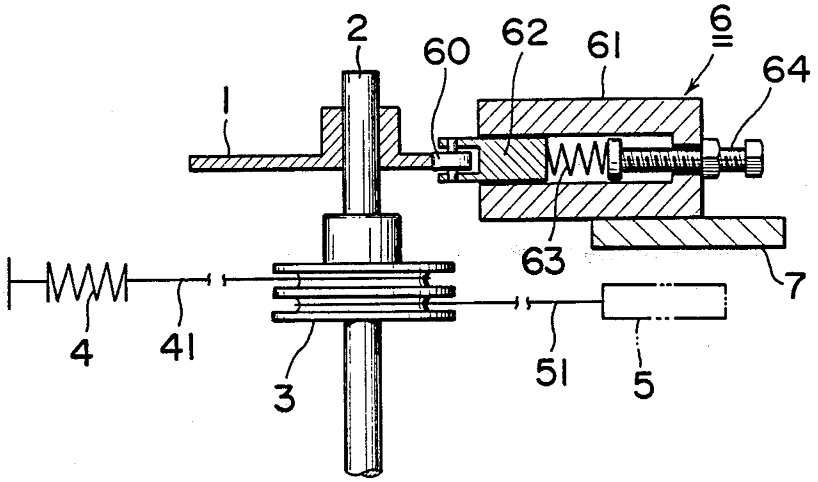
FIG. 2 is a cross section across an arrow A—A in FIG. 1.

In FIG. 1 and FIG. 2, the constitution is such that a movable body 1 comprising a rotatable plate in the shape of cam is fixed to an axis 2 pivoted freely to rotate to the machine frame etc. not shown in the diagrams and, at the same time, a rope wheel 3 is fixed and said rope wheel 3 is wound with wire rope 41 and 42 so that the movable body 1 can rotate in both directions by connecting one end of a coil spring-shaped shape memory alloy 4, other end thereof being fixed to the attachment etc. not shown in the diagrams, to one wire rope 41 and by connecting one end of a bias spring 5, other end thereof being fixed to the attachment etc. not shown in the diagrams, to other wire rope 51.

In the periphery of small arc portion 11 of movable body 1, concave portions 12 and 13 are formed separating them at an interval corresponding to the rotative range of said movable body 1 and a control base 6 is fixed to the attachment 7 mounted to machine frame etc. not shown in the diagrams so as to stand opposite to said small arc portion 11. To the tip of this control base 6 on the side of facing to said movable body 1, a control element 60 comprising a roller is attached and this control element 60 is guided to said one concave portion 12.

The control base 6 in this example is constituted with a case 61 having an opening in the direction of movable body 1 and a slide piece 62 inserted so as to be possible to advance or retreat into said case 61 toward the direction of said movable body 1. To the tip of slide piece 62, said control element 60 is attached freely to roll. Between a screw 64 protruded from the rear end of case 61 and the slide piece 62, a spring 63 is allowed to lie and the control element 60 is pressed against said concave portion 12 by the resilience of this spring 63.

The resilience of spring 63 can be adjusted by a screw 64.

The state shown in the diagrams is a state (soft state) wherein the shape memory alloy 4 resides in the martensite transformation. When the shape memory alloy 4 reaches a temperature to begin the austenite transformation (As point) due to the gradual rising in ambient temperature, the shape memory alloy 4 increases gradually the restoration force thereof (to the direction of contraction in this example) with a rise of temperature, but, since said control element 60 is pressed against the concave portion 12 by spring 63, said restoration force is balanced with a force summed up the bias force of the bias spring 5 and the friction etc. of the axis 2 etc. toward the direction of rotation, and further it is accumulated until exceeding the resilience of spring 63. Hence, when the restoration force surpasses and the control element 60 escapes from the concave portion 12 opposing against the resilience of spring 63, the movable body 1 rotates at a stroke in the direction of an arrow a in FIG. 1 and the stopper 14 of the movable body 1 runs against the case 61 of control base 6 to stop. At this time, a state is realized wherein the control element 60 has been guided to other concave portion 13.

On the other hand, when the shape memory alloy 4 reaches a temperature to begin the martensite transformation (Ms point) due to the gradual lowering in ambient temperature, the alloy 4 becomes gradually soft to lose the force thereof and does not work toward the direction of bias even if the force may decrease to less than the bias force of bias spring 5, but the bias force is accumulated until said bias force exceeds the resilience of spring 63 pressing the control element 60 against the concave portion 13. Hence, when the bias force exceeds said resilience and the control element 60 escapes from said concave portion 13, the movable body 1 rotates at a stroke in the direction of an arrow b in FIG. 1 by the bias force accumulated and other stopper 15 of the movable body 1 runs against the case 61 to stop in the state shown in the diagrams.

EXAMPLE 2

Figure 3:
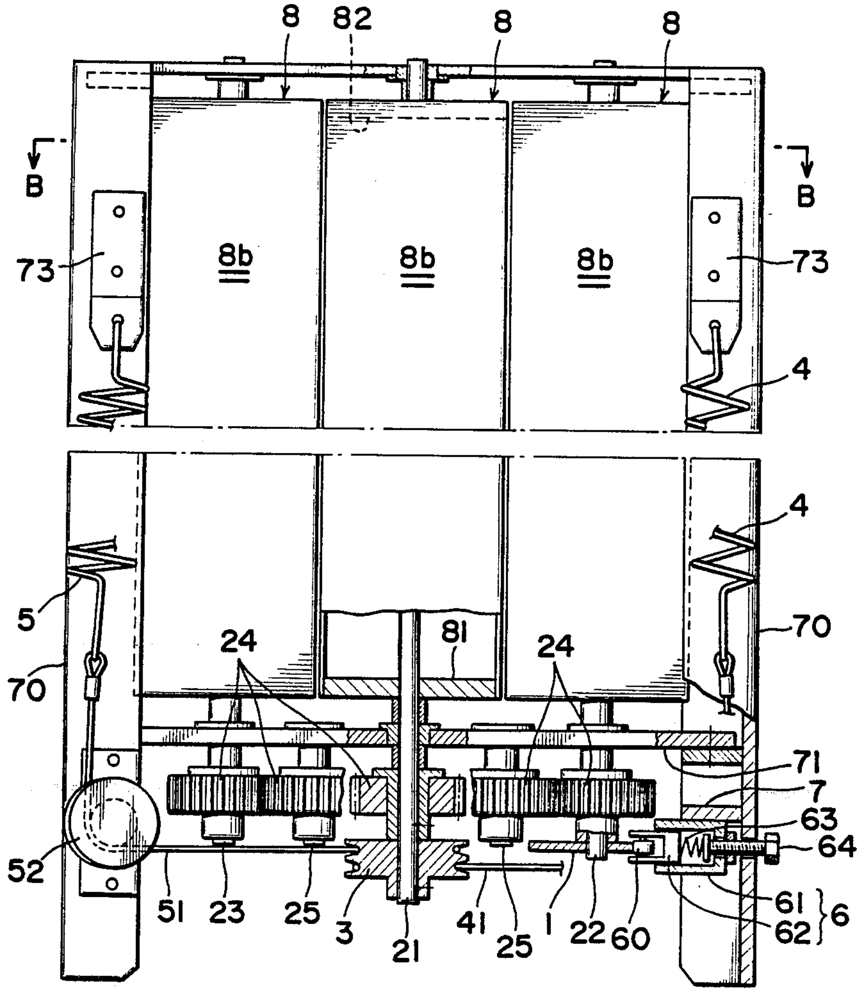
FIG. 3 is a partially broken backside view showing one example of display conversion devices used said actuator for the driving of the display conversion of signs.
Figure 4:
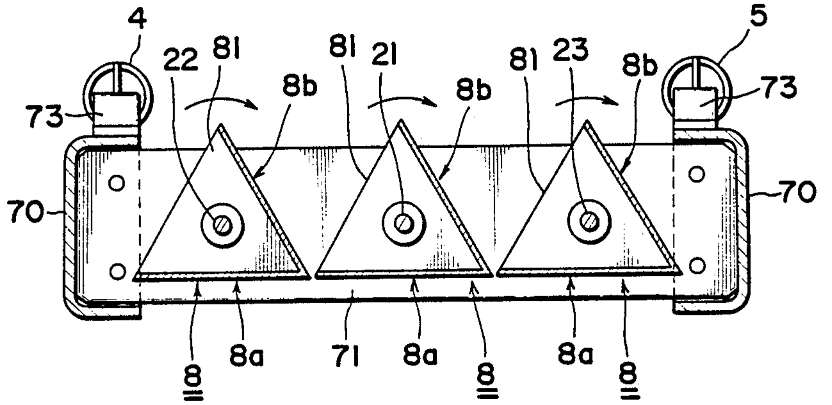
FIG. 4 is a cross section across an arrow B—B in FIG. 3.
Figure 5:
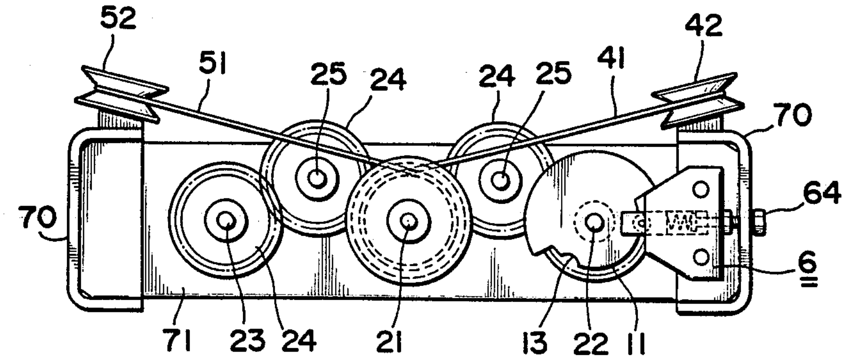
FIG. 5 is a bottom view of the device in FIG. 3.

In this example, an example used said actuator for the driving for the display conversion of signs (road signs) will be illustrated referring to FIG. 3 through FIG. 5.

Between right and left side frames 70 and 70 standing upright, a base plate 71 and a ceiling plate 72 are fixed and axes 21, 22 and 23 are pivoted freely to rotate to the base plate 71 and ceiling plate 72 at equal intervals. Top and bottom plates 81 and 82 of regular triangle are fixed to respective axes 21, 22 and 23 and, between these plates 81 and 82, two plates are fixed to constitute each displaying body 8 having a plurality of display planes **8*a* and 8*b*, respectively, which face to the circumferential direction of respective axes 21, 22 and 23 and which form an angle of 60 degrees each other between adjacent ones. On the display planes 8*a*, 8*a* and 8*a*, a display well organized as a whole, for example, a display of "Beware of Freezing" is provided and, on other display planes 8*b*, 8*b* and 8*b***, a display well organized as a whole, for example, a display of "Run with Care" is provided (The diagrams show the displays in Chinese characters).

To the positions of respective axes 21, 22 and 23 being protruded downward from the base plate 71, a gear wheel 24 is fixed, respectively, so as to be mutually transmitted and, at the same time, to the lower end of axis 21, a rope wheel 3 is fixed. Around this rope wheel 3, wire ropes 41 and 51 are wound to connect the rope 41 to one end of the coil spring-shaped shape memory alloy 4 via a regular pulley 42 (FIG. 5) and to connect the rope 51 to one end of the bias spring 5 via a regualr pulley 52. Other ends of the shape memory alloy 4 and the bias spring 5 are fixed, respectively, to attachments 73 and 73 mounted to right and left side frames 70 and 70.

To the lower end of axis 22, a movable body 1 similar to that in siad Example 1 is fixed and a control base 6 similar to that in said Example 1 is attached to an attachment 7 fixed to the side frame 70 so as to stand opposite to a small arc portion 11 (FIG. 5) of the movable body 1. A roller-shaped control element 60 is attached to the rip of a slide piece 62 in this control base 6 and a state is realized, wherein this control element 60 is pressed against a concave portion 12 of said small arc portion 11 by a spring 63 pressed with an adjusting screw 64.

Displaying bodies 8, 8 and 8 are fixed together with each side frame 70 to a case having a transparent plate in front, which is not shown in the diagrams.

When using the actuator in accordance with the invention for the driving for the display conversion of signs in this way, the shape memory alloy 4 having such a characteristic that the temperature at which the freezing of road is thawed is lower than the temperature to complete the austenite transformation (Af point) of shape memory alloy 4 and the temperature at which the road is frozen is higher than the temperature to complete the martensite transformation (Mf point) of shape memory alloy 4 is used.

When the air temperature rises and reaches a temperature at which the frozen road is thawed out, the control element 60 escapes from the concave portion 12 and simultaneously, by a force generated when the shape memory alloy 4 is transformed to the austenite phase, the movable body 1 rotates at a stroke so as to allow the axes 21, 22 and 23 to rotate by 120 degrees resulting in the rapid conversion of a display in front on each display plane **8*a* to a display on each display plane 8*b***.

Moreover, when the temperature at the place of the installation falls further to a fixed temperature, the bais force of bias spring 5 acts rapidly and each displaying body 8 rotates at a stroke in the reverse direction to that aforementioned resulting in the rapid conversion of a display on each displaying body 8 to the state shown in the diagrams.

EXAMPLE 3

Figure 6:
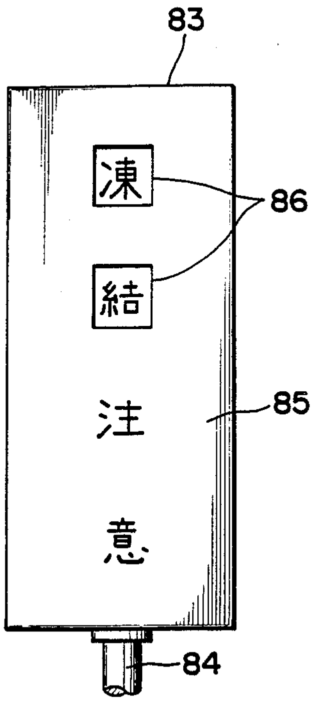
FIG. 6 is a front view showing other example of display conversion devices of signs used said actuator.
Figure 7:
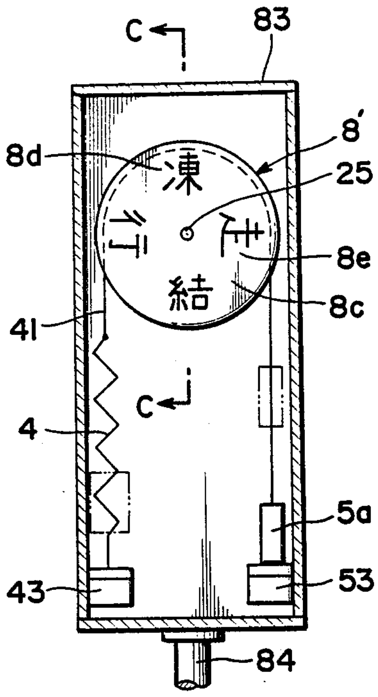
FIG. 7 is a front view showing a state removed the fromt sign board from the device in FIG. 6.
Figure 8:
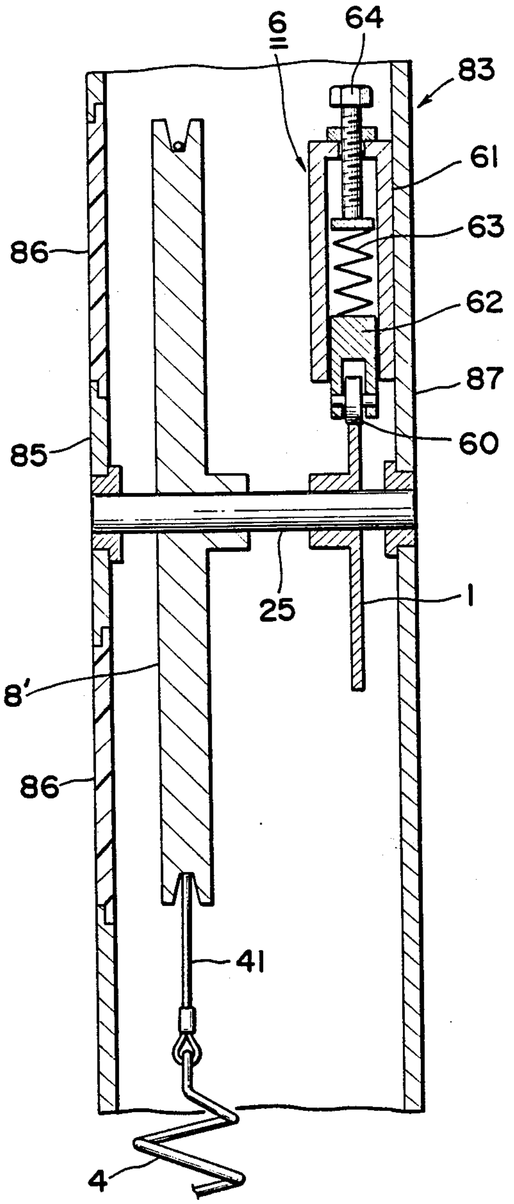
FIG. 8 is a partially magnified cross section across an arrow C—C in FIG. 7.
Figure 9:
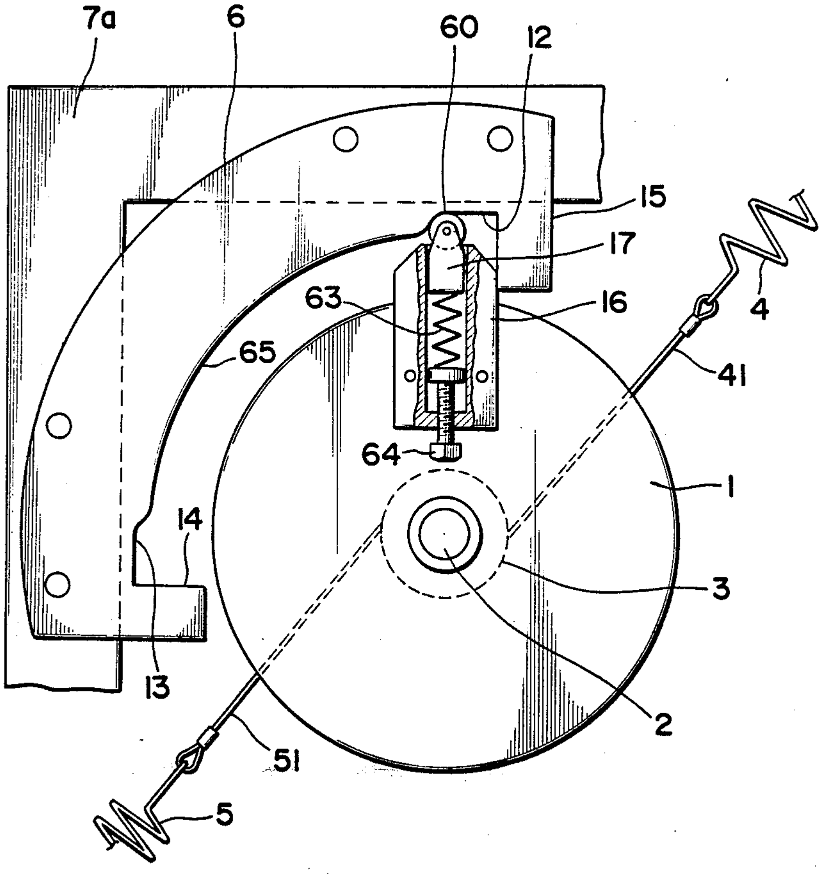
FIG. 9 is a partial plan view showing other example of actuators in accordance with the invention.

FIG. 6 through FIG. 8 shown an other example used the actuator in Example 1 for the driving for the display conversion of signs. A transparent display window 86 is provided to a sign board 85 in front of a case 83 supported by a pole 84 and, inside the case 83, an axis 25 is pivoted freely to rotate to the sign board 85 and a backside plate 87. To this axis 25, a rotatable display disc 8' having a plurality of different coupled displays **8*d* and 8*e* on a surfacial display plane 8*c* is fixed to display selectively one of the different coupled displays 8*d* and 8*e* from the display window 86** when rotating the rotatable display disc by 90 degrees.

The display disc 8' serves also as a rope wheel and, around this, a wire rope 41 is wound, to one end of which the shape memory alloy 4 is a connected and to other end of which a weight **5*a*** is connected.

The other end of the shape memory alloy 4 is connected to an attachment 43 fixed inside the case 83 and, at the same time, the weight **5*a* is so constituted that, when the shape memory alloy 4 has been transformed to the martensite phase, it is placed on an attachment 53 mounted inside the case 83**.

To said axis 25, the movable body 1 is fixed on the backside of the display disc 8' and, facing to this movable body 1, a control base 6 having same structure as in Example 1 is provided and said control base 6 is attached to the backside plate 87 of the case 83.

The rotatable display disc 8' rotates counterclockwise by 90 degrees as in FIG. 7 when the shape memory alloy 4 is subject to the austenite transformation to convert the coupled display **8*d* in the display window 86 to other coupled display 8*e* and rotates clockwise by 90 degrees as in FIG. 7 when the shape memory alloy 4 is subject to the martensite transformation to return the display in the display window 86 to other display 8*d*** again.

In this example, too, the rotation of rotatable display disc 8' is rapid to convert the display at a stroke.

EXAMPLE 4

In the example aforementioned, the concave portions 12 and 13 were provided to the movable body 1, but it is also possible to practice as follows: As shown in FIG.

9, a control base 6 having a concave arc portion 65 is fixed to the machine frame *7a* etc., concave portions 12 and 13 standing opposite to a movable body 1 are formed in this concave arc portion 65, and a case 16 opening toward the direction of said control base 6 is fixed to the movable body 1. At the same time, a slide piece 17 to advance or retreat in the direction of control base 6 is provided in the case 16 and, by allowing this slide piece 17 to hold a control element 60 comprising a roller, the control element 60 is provided on the side of the movable body 1 so that said control element 60 is pressed against the concave portions 12 and 13 by a spring 63 pressed with a screw 64.

In this case, stoppers 14 and 15 are provided to the control base 6 and, when the movable body 1 rotates, the case 16 attached to the side of movable body 1 runs against the stopper 14 or 15, thereby the working range of the movable body 1 can be regulated in constitution.

Since other constitution and function in this example are same as those in Example 1, the illustration thereof will be omitted.

EXAMPLE 5

Figure 10:
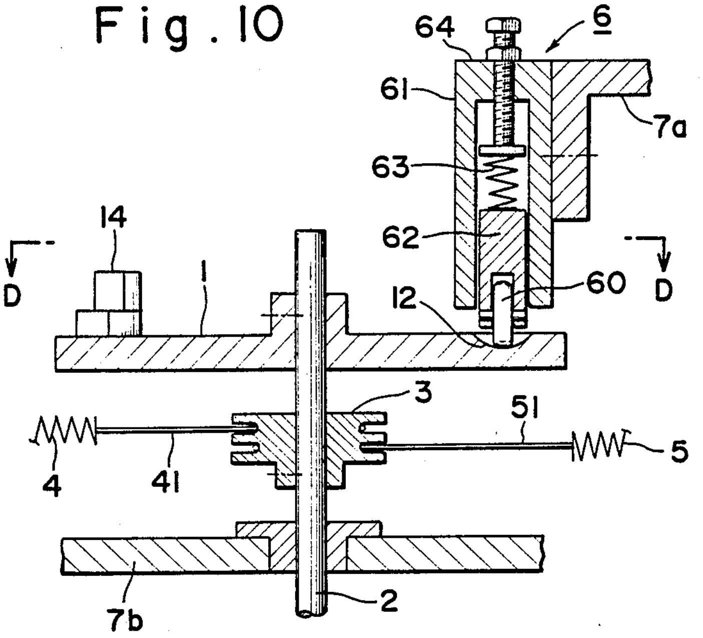
FIG. 10 is a partial cross section showing still other example of actuators.
Figure 11:
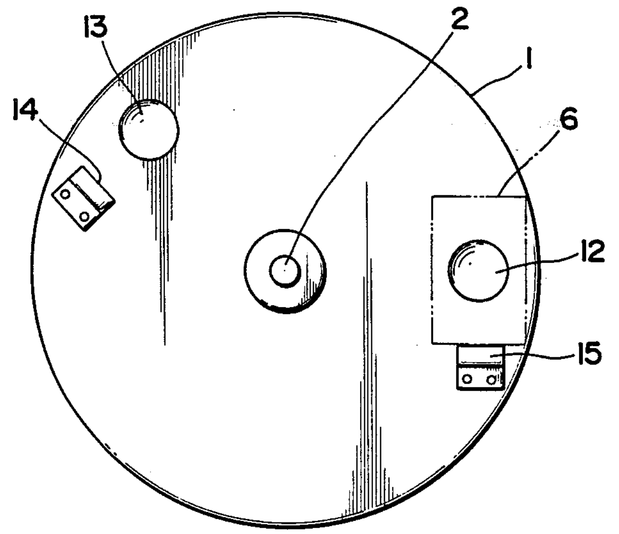
FIG. 11 is a cross section across an arrow D—D in FIG. 10.

In Example 1 aforementioned, the constitution was such that the control element 60 ran against the periphery of the movable body 1, but, instead of such constitution, it is also possible to practice as follows: For example, as shown in FIG. 10 and FIG. 11, an axis 2 is attached freely to rotate to a fixed base *7b*, a movable body 1 and a rope wheel 3 are fixed to this axis 2, a control base 6 similar to that in Example 1 is fixed to the machine frame *7a* etc. in a state of standing opposite to one face of said movable body 1, and concave portions 12 and 13 are formed in said one face of the movable body 1 separating each other at an interval corresponding to the working range of said movable body 1 so that a control element 60 provided on the side of control base 6 is pressed against the concave portion 12 or 13 by a spring 63.

In this example, stoppers 14 and 15 to form the working range of the movable body 1 are attached to suitable positions on said one face of the movable body 1.

Since other constitution and function in this example are same as those in foregoing Example 1, the illustration will be omitted.

EXAMPLE 6

Figure 12:
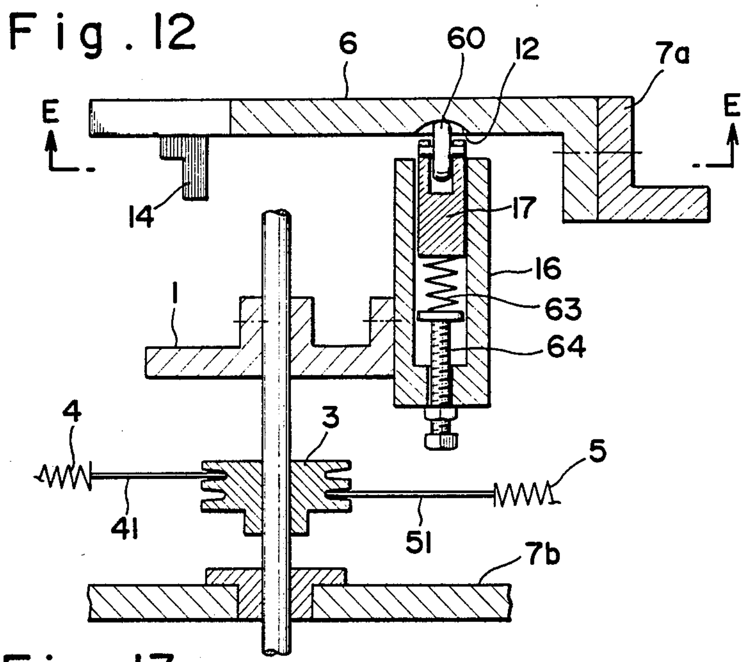
FIG. 12 is a partial cross section showing still more other example.
Figure 13:
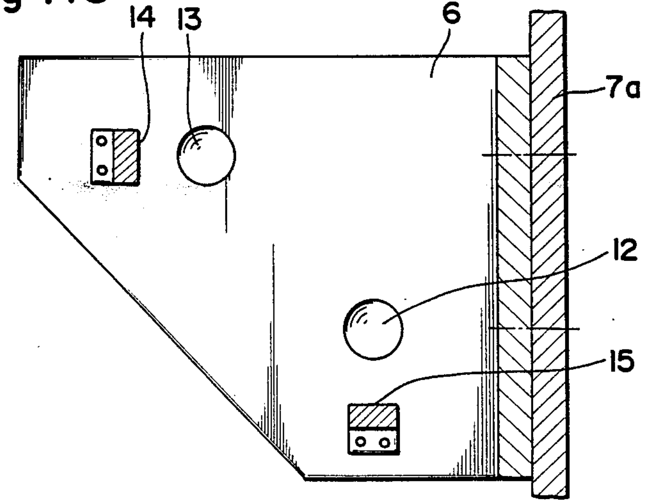
FIG. 13 is a cross section across an arrow E—E in FIG. 12.

Further, instead of the structure in FIG. 10 and FIG. 11, it is also possible to practice as follows: As shown in FIG. 12 and FIG. 13, a plate-shaped control base 6 is fixed to the machine frame *7a* etc. in a state of standing opposite to one face of a movable body 1 and concave portions 12 and 13 are formed in the face of the control base 6 standing opposite to said movable body 1. At the same time, a case 16 opening toward the direction of said control base 6 is fixed to the movable body 1, a slide piece 17 being possible to advance and retreat in the direction of the control base 6 is provided in this case 16, and a roller-shaped control element 60 is held to this slide piece 17 so that said control element 60 is pressed against the concave portion 12 by a spring 63 pressed with a screw 64.

In the case of this example, stoppers 14 and 15 to regulate the working range of the movable body 1 are provided to the control base 6.

Since other constitution and function in this example are same as those in Example 5 shown in FIG. 10 and FIG. 11, the illustration will be omitted.

EXAMPLE 7

Figure 14:
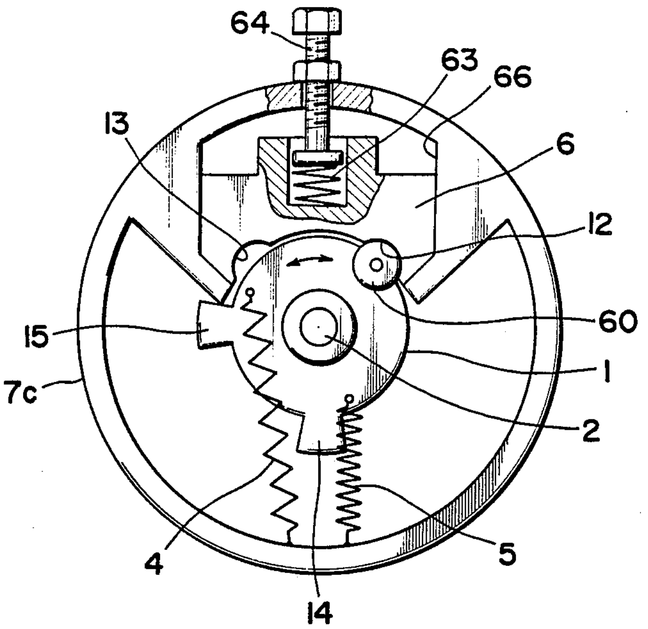
FIG. 14 is a partially broken plan view showing still more other example.

In the actuators in respective examples aforementioned, the constitution was such that the control element 60 was pressed against respective concave portions 12 and 13 by the spring 63, but, replacing such structure, it is also possible to practice as follows: For example, as shown in FIG. 14, a roller-shaped control element 60 is attached freely to roll to the side of a movable body 1, a control base 6 is inserted freely to slide in the direction of said movable body 1 into an accommodating section 66, and concave portions 12 and 13 to which the control element 60 is guided are formed in the face of this control base 6 standing opposite to the movable body 1 so that the control base 6 is pressurized to the direction of the movable body 1 by a spring 63 pressed with a screw 64 to press the concave portions 12 and 13 and the control element 60 against one another.

In this example, an axis 2 is pivoted freely to rotate, for example, to the bottom of a housing *7c* with base, the movable body 1 comprising a rotatable disc is fixed to this axis 2, and said accommodating section is formed inside the housing *7c*. In this structure, stoppers 14 and 15 formed in the movable body 1 run against the tip of the accommodating section 66 to regulate the working range of the movable body 1.

Moreover, the ends of the shape memory alloy 4 and the bias spring 5 are fixed directly to the necessary positions of the movable body 1, respectively, and the other ends thereof are fixed to the necessary positions of the housing *7c*, respectively.

Since the function in this example is same as that in respective examples aforementioned, the illustration will be omitted.

EXAMPLE 8

Figure 15:
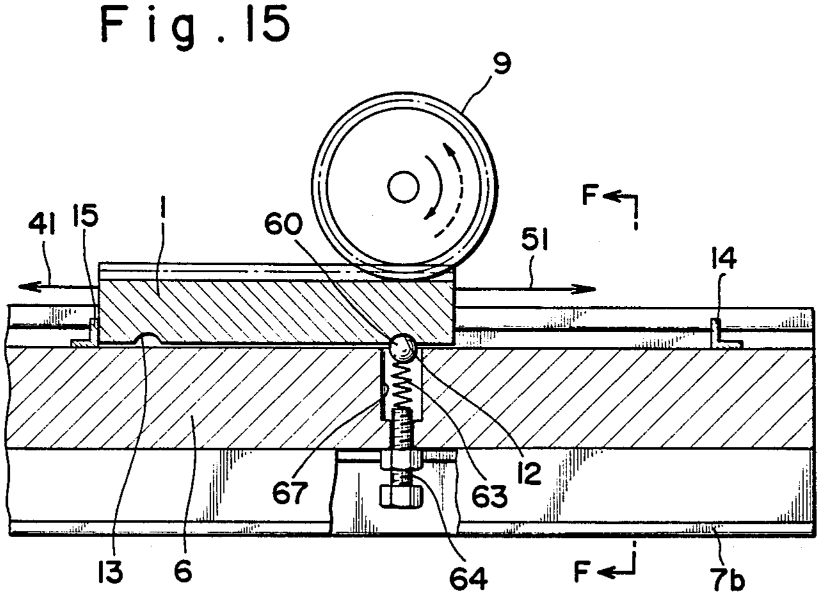
FIG. 15 is a partial cross section showing still more other example.
Figure 16:
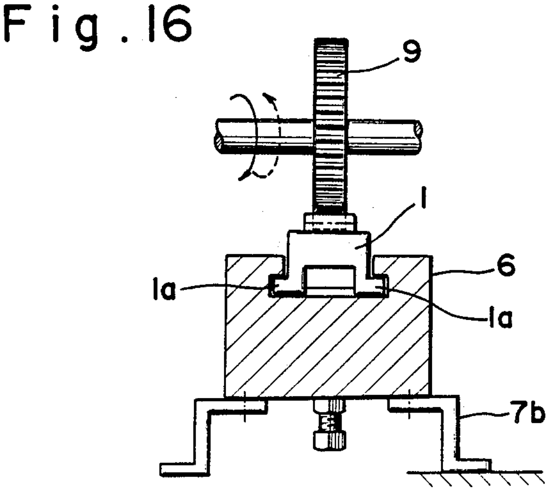
FIG. 16 is a cross section across an arrow F—F in FIG. 15.

FIG. 15 and FIG. 16 show a still other example and the constitution is as follows: A rail-shaped control base 6 being on a fixed base *7b* and having a groove is fixed and, into this control base 6, a movable body 1 with a predetermined length having flanges *1a* and *1a* in the bottom of both longitudinal sides is inserted freely to slide. Concave portions 12 and 13 are provided to the bottom face of the movable body 1 separating each other at an interval corresponding to the working range of said movable body 1, a spring 63 is inserted into a hole 63 provided passing through the control base 6 toward said movable body 1, and a control element 60 comprising a ball is held freely to roll to the tip of this spring 63 so that the spring 63 is compressed with a screw 64 from bottom to press the control element 60 against the concave portion 12 or 13.

To the movable body 1, wire ropes 41 and 51 are connected. The other end of the wire rope 41 is connected to a shape memory alloy not shown in the diagrams and that of the wire rope 51 is connected to a bias spring not shown in the diagrams, respectively, so that the movable body 1 slides between stoppers 14 and 15 provided to the control base 6 according to the predetermined change in temperature.

In this example, the sliding work of the movable body 1 in two directions may be used as it is as a driving force, but the movable body 1 may be constituted rack-shaped and combined with a pinion 9 to convert to the driving force in the direction of rotation as shown in the diagrams.

The mode to use the sliding work of the movable body 1 as it is as a driving force is suitable for the driving for the display conversion of signs wherein, for example, two different displays are given to the display disc sliding along a fixed guide and said display disc is allowed to work slidingly in two directions within a fixed range according to the change in temperature, thereby said two displays are made to display selectively from the display window of sings.

Since other function in this example is same as that illustrated in Example 1, the illustration will be omitted.

Moreover, in Example 8 shown in FIG. 15 and FIG. 16, it is possible to provide the control element 60 on the side of the movable body 1 and to provide the concave portions 12 and 13 on the side of the control base 6.

EXAMPLE 9

Figure 17:
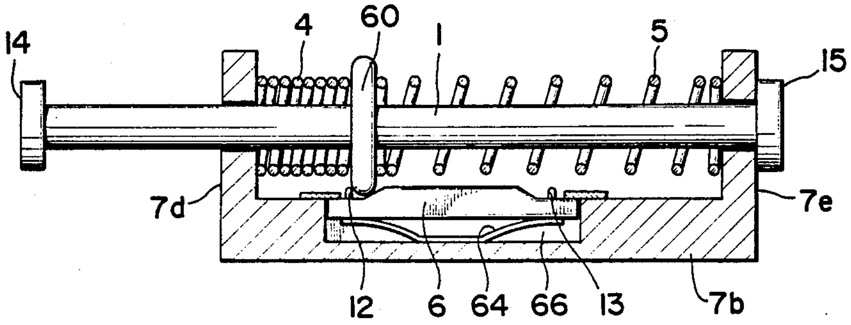
FIG. 17 is a cross section showing still more other example.

FIG. 17 shows a still other example, wherein a frame *7b* having standing walls *7d* and *7e* on both sides is provided, a rod-shaped movable body 1 is pierced freely to slide through said standing walls *7d* and *7e*, sword guard-shaped stoppers 14 and 15 are fixed to both ends of said movable body 1, and a sword guard-shaped control element 60 is fixed to the middle part.

In a state of said movable body 1 being thus inserted, a coil spring-shaped shape memory alloy 4 is equipped between the standing wall *7d* and the control element 60 and, at the same time, a bias spring 5 is equipped between the standing wall *7e* and the control element 60.

An accommodating section 66 is formed in the inner bottom of the frame *7b*, a control base 6 being stoppable for coming off and slidable up and down is inserted into this accommodating section 66 so as to face to the working range of the control element 60. Concave portions 12 and 13 are formed on the side of this control base 6 facing to said movable body 1 and separating each other at an interval corresponding to the working range of the movable body 1 and the control element 60 is guided to one concave portion 12 so that the control base 6 is pressed against the control element 60 by a spring 64.

The shape memory alloy 4 in this example is manufactured to become longer when returning to the austenite phase due to the rising in temperature and the restoration force at the time of returing to the austenite phase is accumulated until it becomes more than a predetermined value because of the concave portion 12 being pressed against the control element 60 by the resillience. When the restoration force becomes more than the predetermined value, the control element 60 presses down the control base 6 and escapes from the concave portion 12 so that the movable body 1 works at a stroke until the stopper 14 runs against the standing wall *7d*.

Also, when the shape memory alloy 4 is subject to the martensite transformation, the force of the spring 5 is accumulated similarly and works at a stroke when the ambient temperature has been lowered to the predetermined value.

In respective examples aforementioned, only the two-directional actuators were illustrated. With respect to the one-directional actuators, the difference lies only in the absence of the concave portion 13 and the bias spring 5 or the weight. Since other structure and function are same as those in respective foregoing examples, the illustration will be omitted.

EXAMPLE 10

Figure 18:
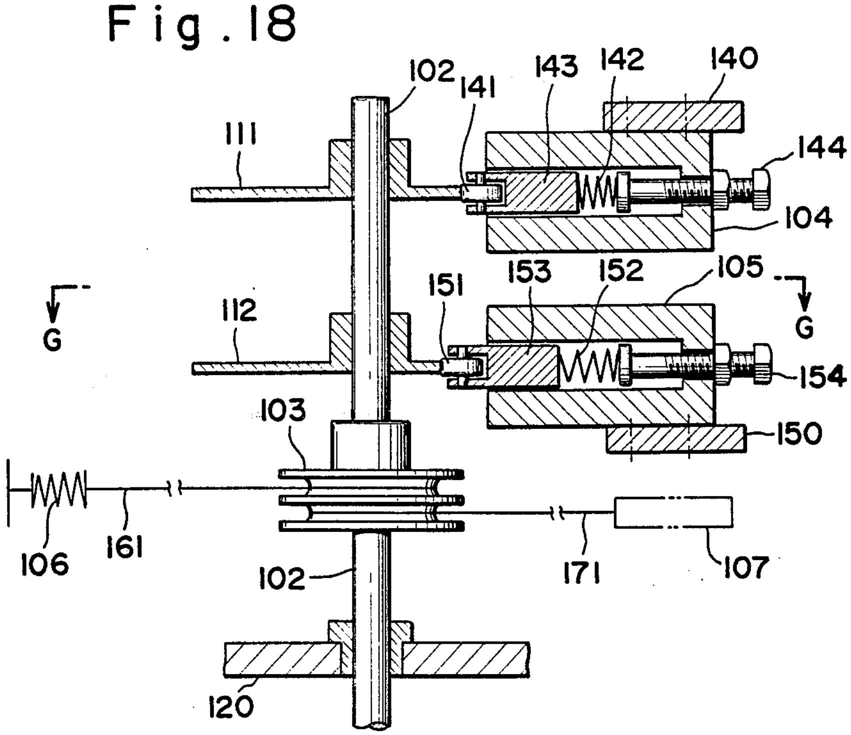
FIG. 18 is a longitudinal cross section of actuator in accordance with the invention.
Figure 19:
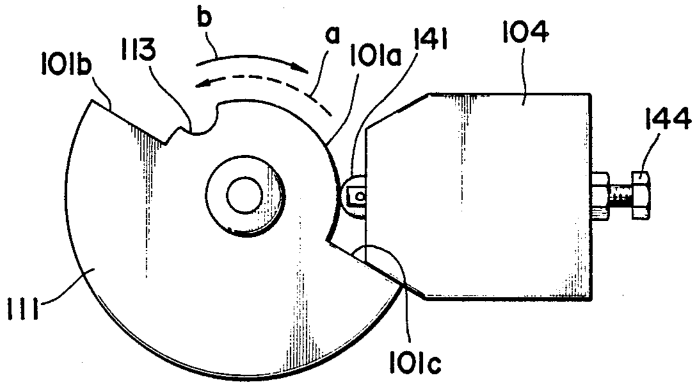
FIG. 19 is a partially omitted plan view thereof.
Figure 20:
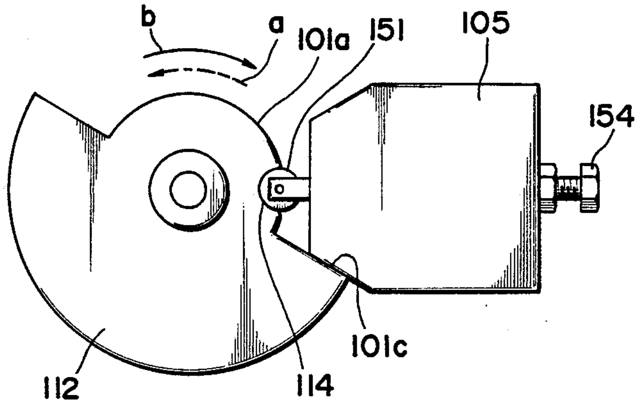
FIG. 20 is a partially omitted cross section across an arrow G—G in FIG. 18.

In FIG. 18 through FIG. 20, an axis 102 is attached freely to rotate to a fixed base 120 such as the machine frame, plate-shaped movable bodies 111 and 112 rotating together and being resemblant to the cam are fixed to this axis 102 and, at the same time, a rope wheel 103 is fixed.

Spring cases 104 and 105 are provided to fixed bases 140 and 150 such as the machine frame so as to stand opposite to each small are portion 101*a* of the movable bodies 111 and 112, springs 142 and 152 are inserted into these spring cases 104 and 105, respectively, in a state of being pressed from rear ends with adjusting screws 144 and 154, slidable holders 143 and 153 are provided to each tip of the springs 142 and 152, and, at the same time, control elements 141 and 151 comprising rollers and being held freely to roll to these holders 143 and 153 are allowed to contact under pressure with said small arc portion 101*a* of the movable bodies 111 and 112.

Around the rope wheel 103, ropes 161 and 171 are wound so as to act in both directions. To the rope 161, one end of a coil spring-shaped shape memory alloy 106 is connected, other end of which is connected to an attachment not shown in the diagrams and, to the rope 171, a bias spring 107 is fixed, other end of which is connected to an attachment not shown in the diagrams.

Hence, when the shape memory alloy 106 is transformed to the austenite phase, the movable bodies 111 and 112 rotate by 120 degrees in the direction of an arrow a in FIG. 19 and FIG. 20 and, when the shape memory alloy 106 is transformed to the martensite phase, the movable bodies 111 and 112 rotate by 120 degrees in the direction of an arrow b in same diagrams. When rotating in this way, stoppers 101*b* and 101*c* formed at both ends of the small arc portion 101*a* of the movable bodies 111 and 112 run against respective spring cases 104 and 105, thereby the working range of the movable bodies in both directions are regulated at a fixed level.

In the small arc portion 101*a* of the movable body 111, a concave portion 113 is formed so that, when the movable bodies 111 and 112 rotate in the direction of said arrow a, the control element 141 contacted with said small arc portion 101*a* is guided. Moreover, in the small arc portion 101*a* of other movable body 112, a concave portion 114 is formed so that, when the movable bodies 111 and 112 rotate in reverse direction, other control element 151 contacted with said arc portion 101*a* is guided.

In the state shown in the diagrams, the shape memory alloy 106 is transformed to the martensite phase. In this state, at a point of time when the shape memory alloy 106 reaches As point due to the rising in temperature in the environment of the installation of actuator and the restoration force generated on the shape memory alloy 106 exceeds the force of the bias spring 107 added the force of the spring 152 acting on the concave portion 114 of the movable body 112 (however, the friction between other components exerting on the rope wheel 103 is neglected) due to the further rising in temperature, the control element 151 escapes from said concave portion 114 and the force having been accumulated in the concave portion 114 acts at a stroke to rotate rapidly the movable bodies 111 and 112 in the direction of arrow a and to allow other control element 141 to come into the concave portion 113 formed in the movable body 111.

On the other hand, at a point of time when the shape memory alloy 106 reaches Ms point due to the lowering in temperature in the environment and the force of the bias spring 107 added the force of the spring 142 acting on the concave portion 113 of the movable body 111 exceeds the force of the shape memory alloy 106 decreasing by the transformation (however, the friction between other components exerting on the rope wheel 103 is neglected) due to the further lowering in temperature, the control element 141 escapes from said concave portion 113 and the force having been accumulated in the concave portion 113 acts at a stroke to rotate rapidly the movable bodies 111 and 112 in the direction of arrow b and to allow the control element 151 to come into the concave portion 114 formed in the movable body 112 as in FIG. 20.

With the actuator in said example, by adjusting the resilience against respective control elements 141 and 151 controlling the work of respective movable bodies 111 and 112 with respective adjusting screws 144 and 154, the temperature at which the force of the shape memory alloy 106 increasing or decreasing with the change in temperature and the bias force added the damping force of respective control elements against the movable body 111 or 112 (however, the friction between other components exerting on the rope wheel 103 is neglected) are balanced, i.e. the working temperature of the movable bodies 111 and 112 in both directions can be adjusted arbitrarily within a fixed range, thereby the temperature hysteresis of the shape memory alloy can be overcome.

For example, in FIG. 32, assuming that the force generated on the shape memory alloy and the bias force are balanced at a temperature Tw between As point and Af point at the time of temperature rising, through the adjustment of resilience to each control element with said each adjusting screw, it is possible to allow the force $P_H$ generated on the alloy to balance with the bias force at the temperature Tw when temperature rises and to allow the force Pc of the alloy to balance with the bias force at same temperature Tw also when temperature falls to work the movable body in both directions at same temperature.

Moreover, generally, with the actuator used the shape memory alloy, the increase or the decrease in force generated on the alloy or damped progresses gradually when the change is slow as in the air temperature, thereby the working is slow. With the actuator in said example, however, the force acting in both directions is accumulated until the temperature in the environment of the installation reaches the working temperature adjusted as above and works rapidly when having reached said temperature, thereby the object matters can be worked at a stroke even if the environment may be slow in the change in temperature. From above, in the cases of signs which require a quick alteration to different display at a fixed temperature depending on the change in temperature as the road signs in cold areas, the actuator is suitable as a driving device for the display conversion thereof.

Further, in the case of the actuator in said example, it is possible to mass-produce the movable body in a fixed shape and to adjust the working temperature with adjusting screw meeting the type and the characteristic of shape memory alloy to be used therefore. Hence, such an actuator that the working temperature is adjustable more easily can be provided compared with the case to adjust, for example, by altering the depth of said concave portion.

EXAMPLE 11

Figure 21:
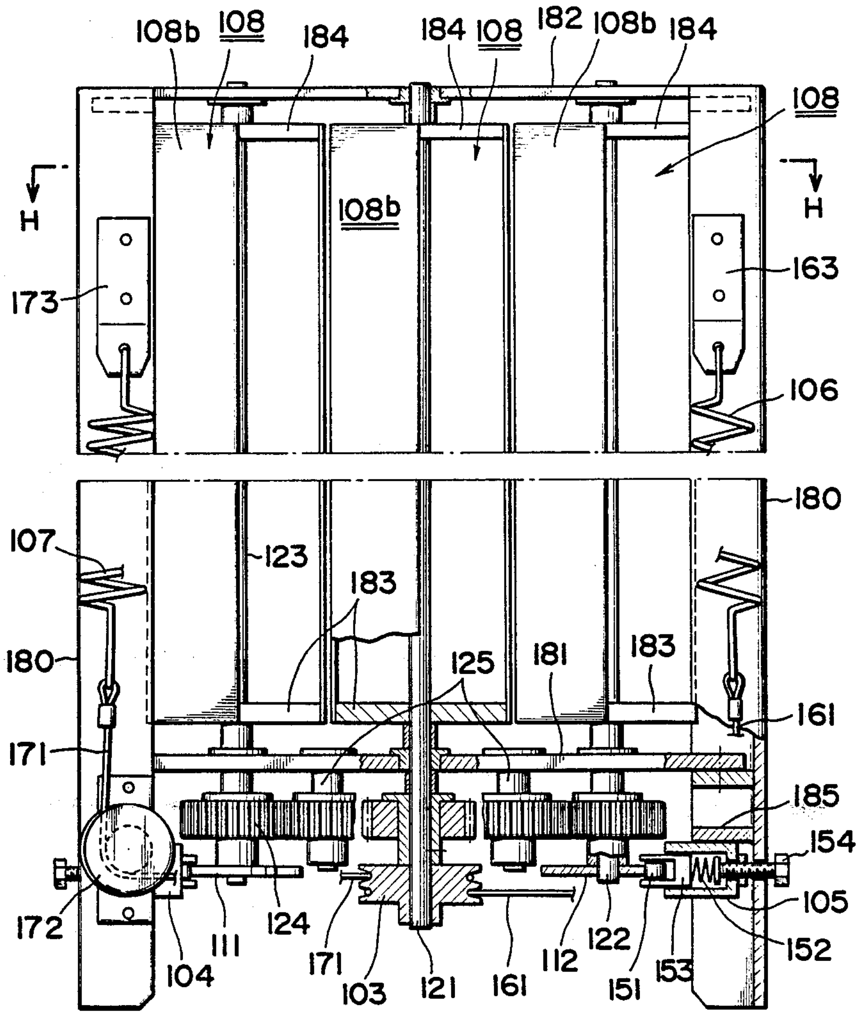
FIG. 21 is a partially broken backside view of an example used said actuator as a driving device for the display conversion of sign.
Figure 22:
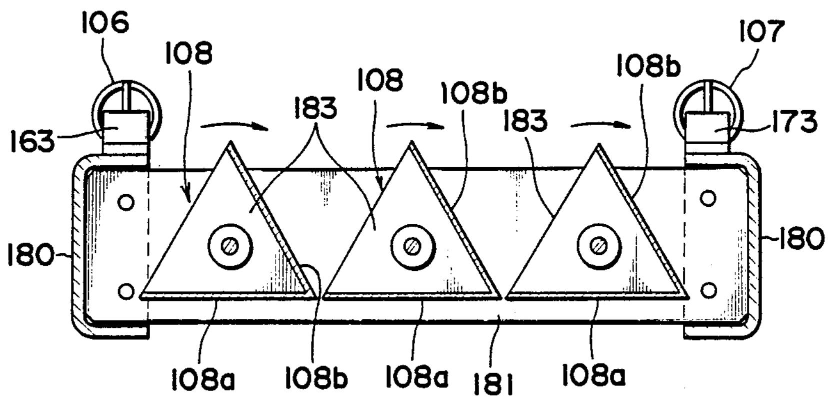
FIG. 22 is a partially omitted cross section across an arrow H—H in FIG. 21.
Figure 23:
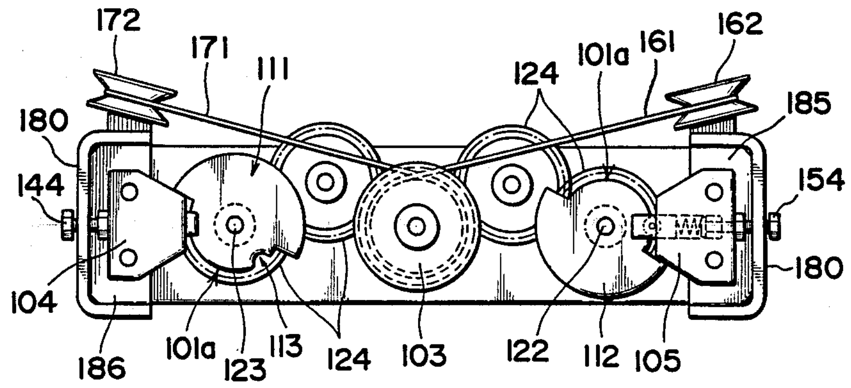
FIG. 23 is a bottom view of the example in FIG. 21.

Next, referring to FIG. 21 and FIG. 22, with respect to an example used said actuator for the driving for the display conversion of signs (road signs), the illustration will be omitted since it is similar to the case in Example 2.

In the case of this example, however, it is further possible to adjust and establish more strictly and easily the working temperature of each displaying bory 108 for conversion by respective adjusting springs 144 and 154.

EXAMPLE 12

Figure 24A:
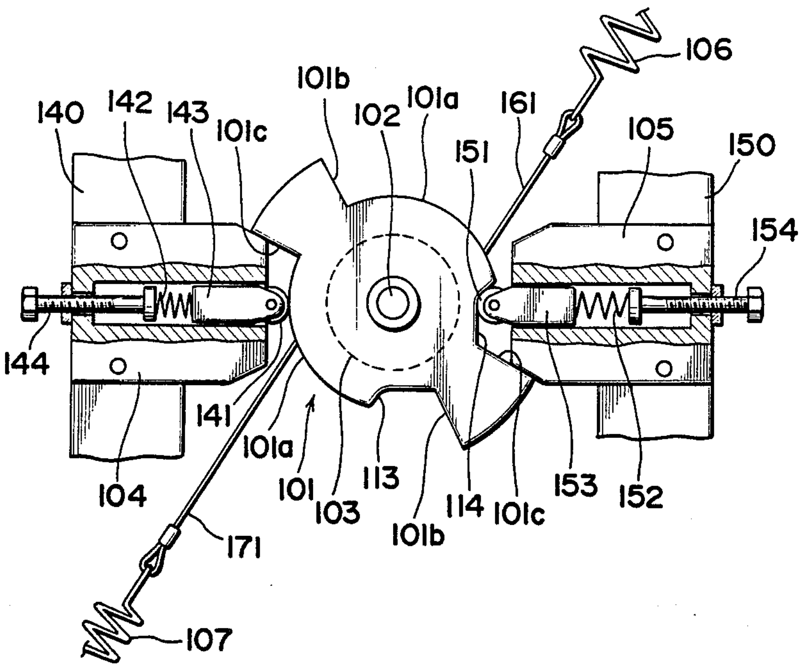
FIG. 24 (*a*), (*b*) and (*c*) are partially broken plan views showing other example of actuator.
Figure 24B:
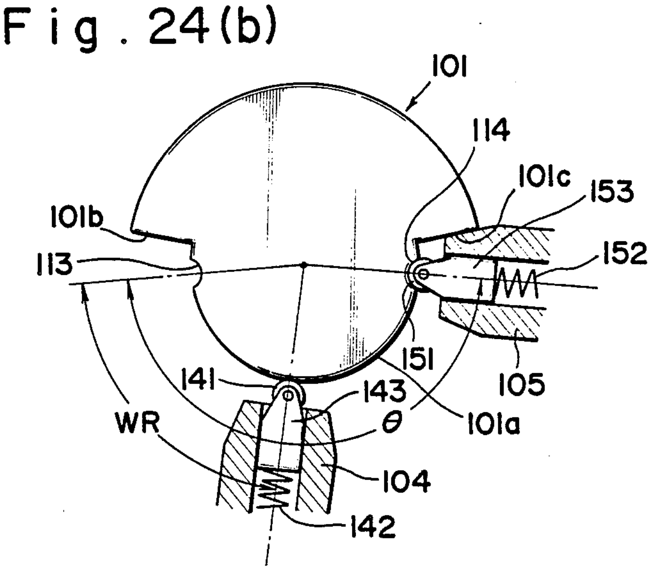
Figure 24C:
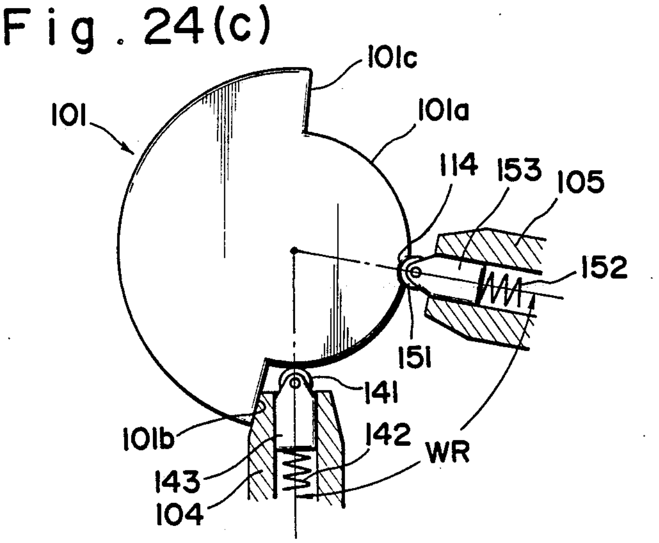

In said example 10, the structure was that the concave portions 113 and 114 were provided to two movable bodies 111 and 112 and the control elements 141 and 151 were allowed to contact under pressure with these separate movable bodies 111 and 112, respectively, but, in the case of the range of angle worked by the movable body being small, it is also possible to practice, as shown in FIG. 24(*a*), in way that one movable body 101 is attached to an axis 102, two (or a plurality of) small arc portions 101*a* and 101*a* are formed in the movable body 101 and, at the same time, spring cases 104 and 105 similar to those in said Example 10 are fixed to supporting bases 140 and 150 so as to stand opposite to these arc portions 101*a* and 101*a*, respectively.

In the case of this example, a control element 141 in a spring case 104 is allowed to contact under pressure with one small arc portion 101*a* and, at the same time, a concave portion 113, to which said control element 141 is guided when the movable body 101 works due to the austenite transformation of shape memory alloy 106, is formed. While, a control element 151 is a spring case 105 is allowed to contact under pressure with other small arc portion 101*a* and, at the same time, a concave portion 114, to which said control element 151 is guided when the movable body 101 works due to the martensite transformation of shape memory alloy 106, is formed. And, similarly to said example, stoppers 101*b* and 101*c* are provided at both ends of respective arc portions 101*a* and 101*a*.

Even when the range of angle in which the movable body 101 rotates is large, if forming respective small arc portions 101*a* and 101*a* contacted with respective control elements 141 and 151 in two steps of top and bottom for the same movable body 101, it is possible to constitute approximately same as this example.

It is also possible to make an angle $\theta$ larger than the reciprocating working range (WR) as shown in FIG. 24(*b*) and to provide two concave portions 113 and 114 and stoppers 101*b* and 101*c* as the diagram shows. Moreover, as shown in FIG. 24(*c*), it is also possible to eliminate one concave portion 113 by using two control elements 141 and 151 provided extending by the reciprocating working angle (WR).

The actuators in FIG. 24(*a*), (*b*) and (*c*) are in a state of the shape memory alloy 106 having been subject to the martensite transformation. Since other constitution and function are same as those in said Example 10, the illustration thereof will be omitted.

EXAMPLE 13

Figure 25:
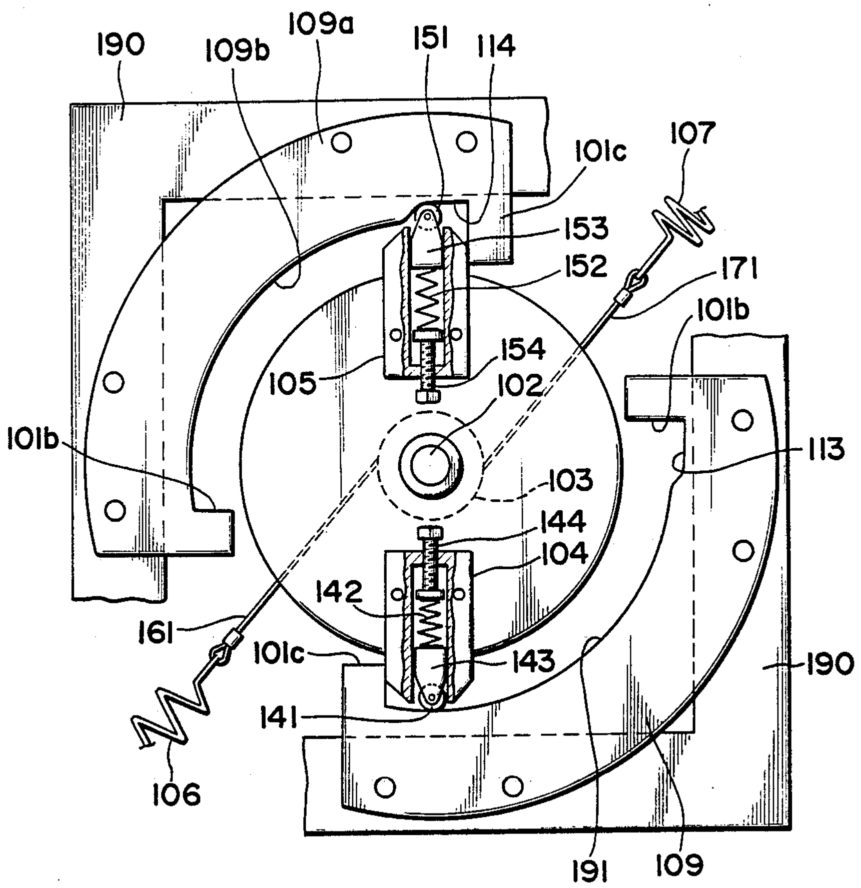
FIG. 25 is a partially broken plan view showing still other example.

In the actuators in respective examples aforementioned, the spring cases 104 and 105 were attached to the supporting bases 140 and 150, but instead of this structure, it is also possible to practice as follows: For example, as shown in FIG. 25, a movable body 101 is attached to an axis 102, spring cases 104 and 105 having similar structure to those in said Example 10 are attached to this movable body 101 and, at the same time, a plurality of control bases 109 and 109*a* are attached to the supporting base 190 etc. so as to stand opposite to the outer circumference of the movable body 101. With concave arc portions 191 and 109*b* of respective control bases 109 and 109*a*, control elements 141 and 151 in spring cases 104 and 105 are contacted under pressure, respectively, a concave portion 113, to which one control element 141 is guided when the movable body 101 is subject to the austenite transformation of the shape memory alloy 106, is formed in the concave arc poriton 191 of one control base 109, and a concave portion 114, to which other control element 151 is guided when the movable body 101 is subject to the martensite transformation of the shape memory alloy 106, is formed in the concave arc portion 109*b* of other control base 109*a*.

In this case, the stoppers 101*b* and 101*c* are provided to the control base 109 and 109*a* and the spring cases 104 and 105 attached to the movable body 101 are allowed to run against the stoppers 101*b* and 101*c*, respectively, when the movable body 101 rotates, thereby the working range of the movable body 101 is regulated in constitution.

The control bases 109 and 109*a* may be constituted unitizing both. For example, if fixing the spring cases 104 and 105 to the movable body 101 so as to be different in level, respectively, with the main point that the spring case 104 is attached to one face of the movable body 1 and the spring case 105 is attached to other face thereof and if providing the control bases 109 and 109*a* standing opposite to respective spring cases 104 and 105, it is possible to practice even though the range of angle in which the movable body 101 rotates may be large.

Since other constitution and function in the example shown in this FIG. 25 are same as those in Example 10, the illustration will be omitted.

The structure to attach the spring cases on the side of the movable body as in FIG. 25 can be applied to the case when providing a plurality of movable bodies 111 and 112 as in said Example 10. In this case, the spring cases 104 and 105 are fixed to the movable bodies 111 and 112, respectively, and the control bases 109 and 109*a* as above are provided standing opposite to said spring cases 104 and 105, or one control base being long in top and bottom directions and having a concave arc face to stand opposite to said spring cases 104 and 105 is provided.

EXAMPLE 14

In respective examples aforementioned, the constitution was that the control elements were contacted with the periphery of the movable bodies 111, 112 and 101, the control base 109 or the like. But, it is also possible to practice, for example, as shown in FIG. 26, in a way that spring cases 104 and 105 are fixed to supporting bases 140, 150 etc. so as to stand opposite to the face of the movable bodies 111, 112, 101, etc. at a fixed angle and control elements 141 and 151 in said cases 104 and 105 are contacted under pressure with the movable bodies 111, 112, 101, etc. or, as shown in FIG. 27, in a way that spring cases 104, 105, etc. are fixed to the movable bodies 111, 112, 101, etc. in the perpendicular direction, a control base 109 standing opposite to the movable bodies 111, 112, 101 etc. is provided, and control elements 141 and 151 are allowed to contact under pressure with the face of this control base 109.

Figure 26:
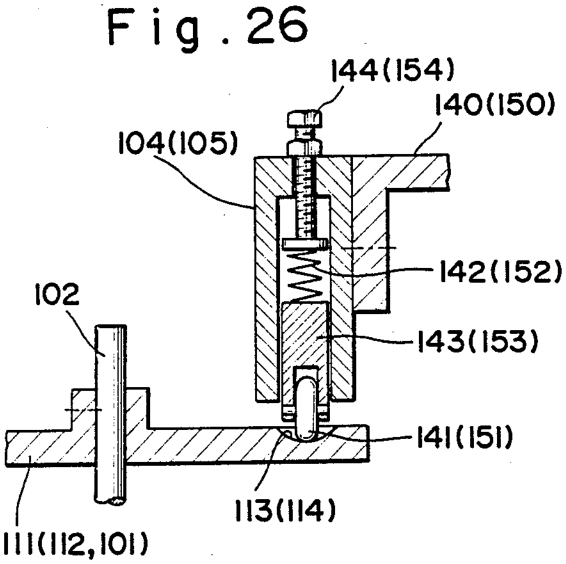
FIG. 26 is a partial cross section showing still more other example.

In the example in FIG. 26, for example, when the control elements 141 and 151 are allowed to contact under pressure with one movable body 101, it is desirable to constitute in a way that the control elements 141 and 151 are contacted with the movable body 101 at positions each separated at a different interval from the axial center of rotation.

Figure 27:
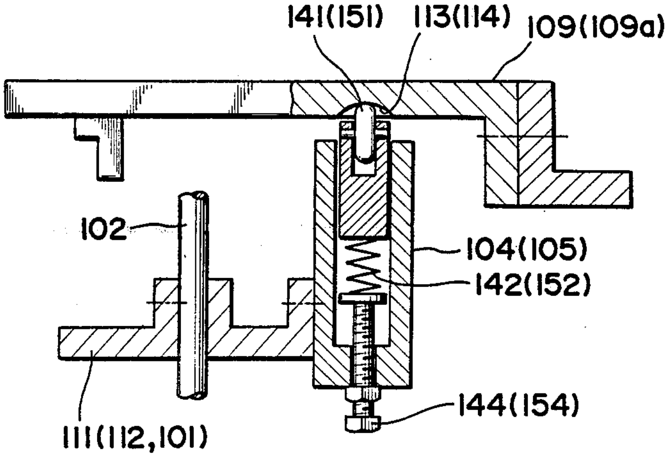
FIG. 27 is a partial cross section showing still more other example.

Also, in the example in FIG. 27, when the spring cases 104 and 105 are attached to the movable body 101 toward the same direction, it is desirable to constitute in a way that one control base 109 with wider area is provided so as to stand opposite to the movable body 1 and respective control elements 141 and 151 are contacted with the control base 109 at positions each separated at a different interval from the extension line of the axial center of rotation of movable body 101.

Further, in the same actuator, if different control elements 141 and 151 are contacted under pressure each separately with the movable body or the control base, respective spring cases may safely be attached in different directions in such ways that one spring case 104 is provided in horizontal direction and other spring case 105 is provided in vertical direction, and the like.

Moreover, it may also safely be made to provide one control element on the side of movable body and other control element on the fixed side combining the control bases therewith at relative positions on the fixed side and movable side, respectively.

EXAMPLE 15

Figure 28:
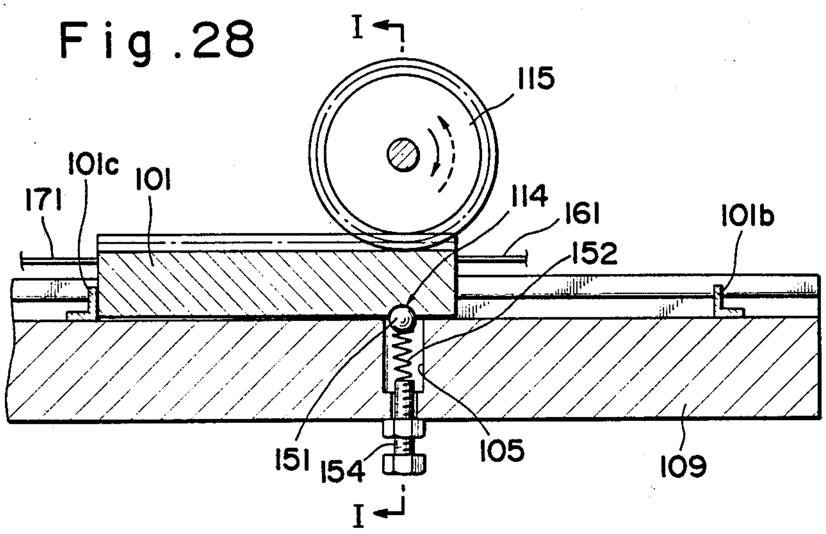
FIG. 28 is a partially omitted cross section showing still more other example.
Figure 29:
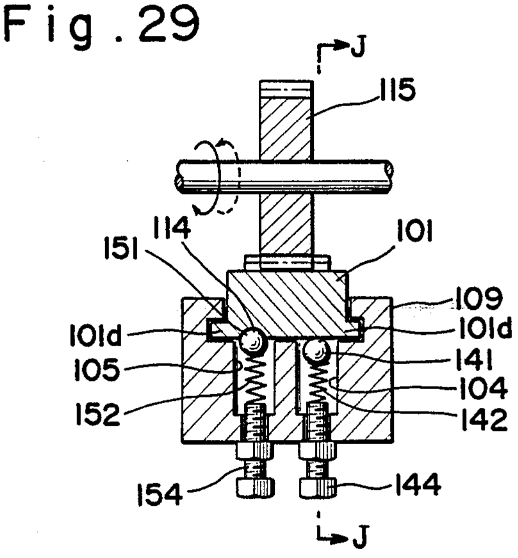
FIG. 29 is a cross section across an arrow I—I in FIG. 28.
Figure 30:
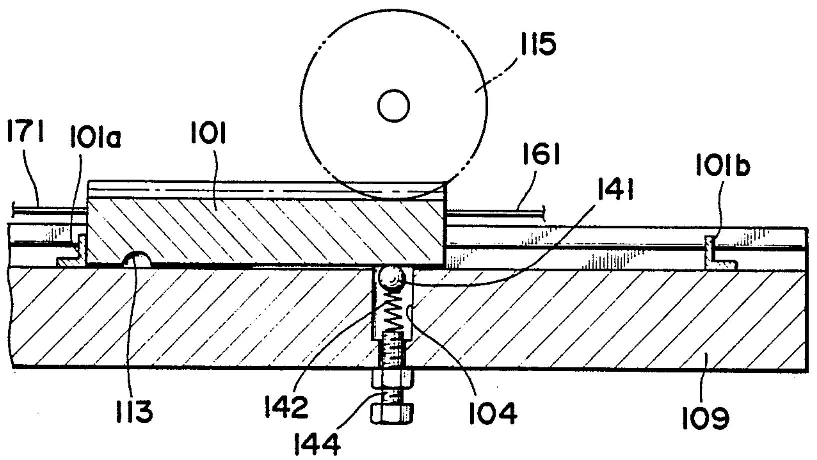
FIG. 30 is a cross section across an arrow J—J in FIG. 29.

FIG. 28 through FIG. 30 show a still other example. A railshaped control base 109 being on the supporting base not shown in the diagrams and having a groove is fixed, a movable body 101 with a fixed length having flanges 101*d* and 101*d* in the bottom of both sides in the longitudinal direction is inserted freely to slide into this control base 109, two holes are formed at same positions in the transverse direction of the control base 109 piercing therethrough toward said movable body 101 to constitute spring cases 104 and 105, and springs 142 and 152 are inserted into these spring cases 104 and 105. At the same time, said springs 142 and 152 are pressed with adjusting screws 144 and 154 pushed into from the backside of the control base 109 and control elements 141 and 151 comprising balls at the tip of the springs 142 and 152 are contacted under pressure with the movable body 101.

Wire ropes 161 and 171 are connected to both ends of the movable body 101, the wire rope 161 and the wire rope 171 are connected to the shape memory alloy and the bias spring both not shown in the diagrams, respectively, and the movable body 101 slides between stoppers 101*b* and 101*c* provided to the control base 109 depending on the predetermined change in temperature.

Moreover, in the movable body 101, a concave portion 113, to which the control element 141 is guided when said movable body 101 works to the right as in FIG. 30, and a concave portion 114, to which the control element 151 is guided as in FIG. 28 when the movable body 101 works to the left, are formed, respectively. When the environmental temperature rises and reaches a fixed established temperature and the shape memory alloy not shown in the diagrams and connected to the wire rope 161 is subject to the austenite transformation, the control element 151 escapes from the concave portion 114 to work rapidly in the right direction as in FIG. 28 until the movable body 101 runs against the stopper 101*b*, and simultaneously, other control element 141 is guided to other concave portion 113. When the temperature falls to a fixed established temperature and said shape memory alloy is subject to the martensite transformation, the control element 141 escapes from the concave portion 113 to return rapidly the movable body 101 to the state shown in the diagram.

In this example, the sliding work of the movable body 101 in two directions may be utilized as it is as a driving force, but, as shown in the diagram, the movable body 101 may be constituted rack-shaped and a pinion 115 is combined with this to convert the driving force to the rotational direction.

When utilizing the sliding work of the movable body 101 as it is as a driving force, the actuator is suitable for the driving for the display conversion of signs, wherein, for example, two different displays are given to a display disc sliding along a fixed guide and, by allowing said display disc to work slidingly in two directions within a fixed range depending on the change in temperature, said two displays are allowed to appear selectively from the display window of signs.

Since other function in this example is same as that illustrated in Example 10, the illustration will be omitted.

Moreover, in the example shown in FIG. 28 and FIG. 29, the control elements 141 and 151 and the concave portions 113 and 114 can be provided on the side of the movable body 101 and on the side of the control base 109, respectively. In this case, the spring cases 104 and 105 are provided downward on both sides of the movable body 101 and respective control elements are allowed to contact with both sides of the control base 109.

EXAMPLE 16

Figure 31:
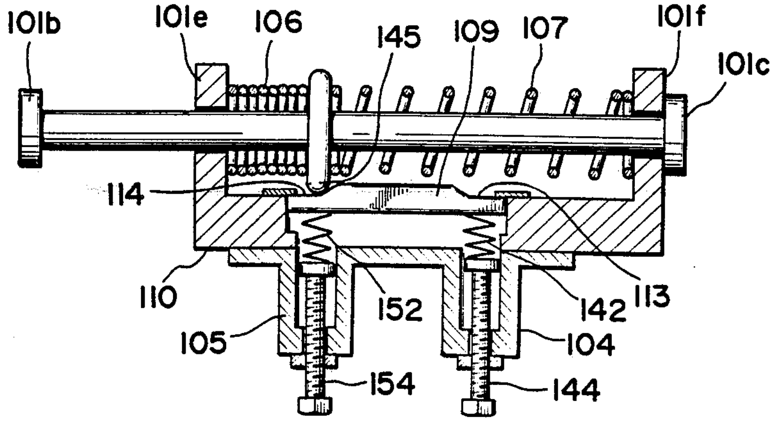
FIG. 31 is a cross section showing still more other example.

FIG. 31 shows still more other example. In this constitution, a supporting frame 110 having standing walls 101*e* and 101*f* on both sides is provided, a rod-shaped movable body 101 is allowed to pass freely to slide through the standing walls 101*e* and 101*f*, sword guard-shaped stoppers 101*b* and 101*c* are fixed to both ends of said movable body 101, and a sword guard-shaped control element 145 is fixed to the middle part thereof.

In a state of said movable body 101 being thus inserted, a coil spring-shaped shape memory alloy 106 is equipped between the standing wall 101*e* and the control element 145 and, at the same time, a bias spring 107 is equipped between the standing wall 101*f* and the control element 145.

Spring cases 104 and 105 are provided to the bottom of the frame 110, springs 142 and 152 pressed with adjusting screws 144 and 154 are inserted into these spring cases 104 and 105, and a control base 109 is allowed to contact under pressure with said control element 145 with these springs 142 and 152. A concave portion 114, to which the control element 145 is guided when the movable body 101 works to the left in said diagram, and a concave portion 113, to which the control element 145 is guided when the movable body 101 works to the right in said diagram, are formed in said control base 109 so that the resilience of the control base 109 against the control element 145 can be adjusted each separately at the position of the concave portions 113 and 114.

The shape memory alloy 106 in this example is manufactured to become longer when subject to the austenite transformation due to the rising of temperature and, if the environmental temperature rises to a fixed established temperature and the shape memory alloy 106 is subject to the austenite transformation, the control element 145 escapes from the concave portion 114 to work the movable body 101 at a stroke to the right in said diagram and, at the same time, the control element 145 is guided to the concave portion 113. If the environmental temperature falls to a fixed temperature and the shape memory alloy 106 is subject to the martensite transformation, the control element 145 escapes from the concave portion 113 to work the movable body 101 at a stroke to the left in said diagram and to return it to the state shown in the diagram. It is desirable to constitute the contact portion of the control element 145 with the control base 109 in this example with a roller or ball.

Since other function in the example shown in FIG. 31 is same as that in Example 10, the illustration will be omitted.

With the one-directional actuator in accordance with the invention, the restoration force when the shape memory alloy is transformed to the austenite phase is accumulated until it becomes a fixed value. The actuator works rapidly therefore even in an environment, the change in temperature being slow as the cases of air temperature and room temperature.

Moreover, with the two-directional actuator in accordance with the invention, two-dimensional force is accumulated until it becomes fixed value and the actuator acts at a stroke when becoming more than a fixed value making it possible to work rapidly even in an environment, the change in temperature being slow.

Hence, when using these as the driving devices for the display conversion of signs, the display is converted rapidly and no half way display appears on the way.

With the improved type two-directional actuators in accordance with the invention, the forces to work the movable body at the time of temperature rising and at the time of temperature lowering are adjusted each separately with the adjusting screws, thereby the working temperature of actuator at the time of temperature rising can be established arbitrarily and easily within a range from a temperature, at which the shape memory alloy begins to be transformed to the austenite phase and the force generated thereon is balanced with the bias force etc., to a temperature, at which the shape memory alloy reaches the Af point, and the working temperature of actuator at the time of temperature lowering can also be established arbitrarily and easily within a range from a temperature, at which the force damped in the process of the shape memory alloy being transformed to the martensite phase is balanced with the bias force etc. to the Mf point. Hence, the effect of the temperature hysteresis of shape memory alloy can be removed with a simple structure.

Furthermore, with the actuators in accordance with the invention, the movable body can be worked rapidly in both directions even in an environment, the change in temperature being slow as the case of air temperature. Hence, with respect to the signs which require to convert rapidly the display when the air temperature having become a fixed temperature as with the road signs, the actuators are optimal for the driving for conversion.

What is claimed is:

1. An actuator used shape memory alloy characterized in that, in the actuator equipped with a shape memory alloy allowing a movable body to work in one direction by the restoration force to the memorized shape at the time of temperature rising, a control base standing opposite to at least part of said movable body is provided, concave portions are provided to one of said movable body and control base and, at the same time, a control element is provided to the other thereof to guide said control element into said concave portion and to press said concave portion and control element against one another by a fixed resilience.

2. The actuator used shape memory alloy according to claim 1, wherein the control element is a roller or ball.

3. An actuator used shape memory alloy characterized in that, in the two-directional actuator equipped with a movable body regulated in a state of being possible to work in two directions within a fixed range, a shape memory alloy to allow said movable body to work in one direction by the restoration force to the memorized shape at the time of temperature rising and a bias spring or a weight to allow said movable body to work in other direction at the time of temperature lowering, a control base standing opposite to at least part of said movable body is provided, concave portions are provided to one of said movable body and said control base separating them at an interval corresponding to the working range of said movable body and, at the same time, a control element to be guided to said concave portions by the working of said movable body is provided to the other thereof so that said concave portion and control element are pressed against one another by a fixed resilience in a state of said control element being guided to one of said concave portions.

4. The actuator used shape memory alloy according to claim 3, wherein the movable body is constituted with a rotatable plate attached to the axis so as to rotate in both directions within a fixed range of angle, the concave portions are formed in said movable body on a concentric circle with the axial center of rotation of said movable body separating them at an interval corresponding to the rotating range of said movable body and the control base is constituted with a case provided in immovable state and a slide piece provided in said case so as to be possible to advance and retreat toward said movable body so that said control element is pressed against said concave portion with a spring in a state of the control element comprising a roller or ball provided to the slide piece in said control base being guided to one of said concave portions.

5. The actuactor used shape memory alloy according to claim 3, wherein the movable body has a slide piece or a lever piece being possible to advance and retreat toward the direction of the control base, the control element comprising a roller or ball is held to said slide piece or lever piece and the concave portions are formed in the control base in immovable state standing opposite to the rotating locus of the control element in said movable body so that said control element is pressed with a spring in a state of being guided to one of said concave portions.

6. The actuator used shape memory alloy according to claim 3, wherein the control element comprising a roller or ball is provided to the movable body attached to the axis so as to rotate in both directions within a fixed range of angle, the control base is provided so as to be possible to advance and retreat standing opposite to the rotating locus of the control element in said movable body and, at the same time, the concave portions facing to the rotating locus of said control element are formed in said control base so that said control base is pressed against said control element with a spring in a state of said control element being guided to one of said concave portions.

7. The actuator used shape memory alloy according to claim 3, wherein the movable body is provided so as to work reciprocatively within a fixed range.

8. The actuator used shape memory alloy according to claim 3, wherein a rod-shaped movable body is provided so as to work reciprocatively to the longitudinal direction within a fixed range, the control element is provided to this movable body and the control base is provided facing to the working range of this control element so that said control element and said concave portion are pressed against one another with a spring in a state of said control element being guided to one of the concave portions provided to this control base.

9. The actuator used shape memory alloy according to any one of claim 4 through claim 8, wherein the resilience of the spring to press the concave portion and the control element against one another is constituted freely to adjust.

10. The actuator used shape memory alloy according to any one of claims 4 through 6, including a device for the display conversion of signs, wherein, in the signs having such a structure that they have two display faces being in parallel with an axis and forming mutually a fixed angle between adjacent ones facing to the circumferential direction having the center on said axis, a displaying body, different displays being given to said two display faces thereof, respectively, is provided and, by allowing said displaying body to rotate with a driving device depending on the change in temperature at the place of the installation, one of said display faces is displayed selectively toward the surface, the actuator being used as said driving device.

11. The actuator used shape memory alloy according to any one of claims 4 through 6, including a device for the display conversion of signs, wherein, in the signs having such a structure that one or several display windows are provided to a sign board, a rotatable display disc, two different displays being given thereto, is pivoted on the backside of said sign board and, by allowing said rotatable display disc to rotate with a driving device depending on the change in temperature at the place of the installation, one of said two different displays in displayed selectively from said display window, the actuator being used as said driving device.

12. The actuator used shape memory alloy according to any one of claims 7 or 8, including a device for the display conversion of signs, wherein, in the signs having such a structure that one or several display windows are provided to a sign board while a slidable display plate, two different displays being given thereto, is provided on the backside of said sign board and, by allowing said slidable display plate to slide with a driving device depending on the change in temperature at the place of the installation, one of said several different displays is displayed selectively from said display window, the actuator being used as said driving device.

13. An actuator used shape memory alloy characterized in that a plurality of movable bodies regulated so as to work in two directions within a fixed range, a shape memory alloy to allow said each movable body to work in one direction by the restoration force to the memorized shape at the time of high temperature and a bias spring or a weight to allow said each movable body to work in other direction at the time of low temperature are provided, a control element pressed by a spring inserted into a spring case in a state of the resilience being adjustable with an adjusting screw is allowed to contact under pressure with said each movable body, a concave portion, to which the control element in contact with said movable body when said movable body works in one direction is guided, is formed in part of said movable bodies and, at the same time, a concave portion, to which the control element in contact with said movable body when said movable body works in other direction is guided, is formed in other movable bodies.

14. An actuator used shape memory alloy characterized in that a movable body regulated so as to work in two directions within a fixed range, a shape memory alloy to allow said movable body to work in one direction by the restoration force to the memorized shape at the time of high temperature and a bias spring or a weight to allow said movable body to work in other direction at the time of low temperature are provided, a plurality of control elements pressed by springs each inserted into a spring case in a state of the resilience being adjustable with adjusting screws are allowed to contact under pressure with said movable body, a concave portion, to which part of said control elements is guided when said movable body works in one direction, is formed in said movable body and, at the same time, a concave portion, to which other control elements are guided when working in other direction, is formed.

15. An actuator used shape memory alloy characterized in that a plurality of movable bodies regulated so as to work in two directions within a fixed range, a shape memory alloy to allow said each movable body to work in one direction by the restoration force to the memorized shape at the time of high temperature and a bias spring or a weight to allow said each movable body to work in other direction at the time of low temperature are provided, a control base standing opposite to said each movable body is provided, a spring case inserted a spring, the resilience thereof being adjustable with an adjusting screw, is provided to said each movable body so that each control element pressed by said spring is allowed to contact under pressure with each control base, said movable body standing opposite thereto, a concave portion, to which the control element in contact with said control base is guided when said each movable body works in one direction, is formed in part of said control bases and, at the same time, a concave portion, to which the control element in contact with said control base is guided when said each movable body works in other direction, is formed in other control bases.

16. An actuator used shape memory alloy characterized in that a plurality of movable bodies regulated so as to work in two directions within a fixed range, a shape memory alloy to allow said each movable body to work in one direction by the restoration force to the memorized shape at the time of high temperature and a bias spring or a weight to allow said each movable body to work in other direction at the time of low temperature are provided, a control base standing opposite to said each movable body is provided, a spring case inserted a spring, the resilience thereof being adjustable with an adjusting screw, is provided to said each movable body so that each control element pressed by said spring is allowed to contact under pressure with said control base, a concave portion, to which part of said control elements is guided when said each movable body works in one direction, is formed in part of said control bases and, at the same time, a concave portion, to which other control elements are guided when said each movable body works in other direction, is formed in other part of said control bases.

17. An actuator used shape memory alloy characterized in that a movable body regulated so as to work in two directions within a fixed range, a shape memory alloy to alloy said movable body to work in one direction by the restoration force to the memorized shape at the time of high temperature and a bias spring or a weight to allow said movable body to work in other direction at the time of low temperature are provided, a control base standing opposite to said movable body is provided, a plurality of spring cases each inserted a spring, the resilience thereof being adjustable with an adjusting screw, are provided to said movable body so that each control element pressed by said each spring is allowed to contact under pressure with said control base, a concave portion, to which part of said control elements is guided when said movable body works in one direction, is formed in said control base and, at the same time, a concave portion, to which other control elements are guided when working in other direction, is formed.

18. The actuator used shape memory alloy according to any one of claim 13 through claim 17, wherein the movable body is provided so as to rotate by attaching it to the axis.

19. The actuator used shape memory alloy according to any one of claim 13 through claim 17, wherein the movable body is provided so as to work linearly and reciprocatively.

20. The actuator used shape memory alloy according to any one of claim 13 through claim 17, wherein the control element is a roller or a ball.

21. An actuator used shape memory alloy characterized in that a movable body in a state of being workable linearly in both directions within a fixed range, a shape memory alloy to allow said movable body to work in one direction by the restoration force to the memorized shape at the time of high temperature and a bias spring or a weight to allow said movable body to work in other direction at the time of low temperature are provided, a control element is attached to said movable body, a control base being possible to advance or retreat to the direction of said control element within a fixed range is provided facing to the working range of said control element and a concave portion, to which said control element is guided when said movable body works in one direction, and a concave portion, to which said control element is guided when said movable body works in other direction, are provided to said control base so that said control base is pressurized at the position of said each concave portion by a spring inserted into each spring case in a state of the resilience being adjustable with each adjusting screw and said control base is allowed to contact with said control element.

22. The actuator used shape memory alloy according to any one of claims 13 through 17 or 21, including a device for the display conversion of signs, wherein, in the signs having such a structure that, by providing a displaying body, two different displays being given to the surface thereof, and by allowing said display body to work with a driving device in two directions within a fixed range depending on a predetermined change in temperature, one of two displays on said displaying body is displayed selectively, the actuator being used as said driving device.

* * * * *

UNITED STATES PATENT AND TRADEMARK OFFICE

CERTIFICATE OF CORRECTION

PATENT NO. : 4,914,908

DATED : APRIL 10, 1990

INVENTOR(S) : MASASHI SUGIYAMA ET AL.

It is certified that error appears in the above-identified patent and that said Letters Patent is hereby corrected as shown below:

On the title page, in item [75]:

In the inventors, delete "Ulyama" and insert --Uyama--.

Signed and Sealed this

Fifteenth Day of October, 1991

*Attest:*

HARRY F. MANBECK, JR.

*Attesting Officer*

*Commissioner of Patents and Trademarks*